US012518635B2

(12) United States Patent
Askarpour

(10) Patent No.: US 12,518,635 B2
(45) Date of Patent: Jan. 6, 2026

(54) COPILOT REPLACEMENT SYSTEM AND RELATED METHODS

(71) Applicant: INNOVATIVE SOLUTIONS & SUPPORT, INC., Exton, PA (US)

(72) Inventor: Shahram Askarpour, Exton, PA (US)

(73) Assignee: INNOVATIVE SOLUTIONS & SUPPORT, INC., Exton, PA (US)

( * ) Notice: Subject to any disclaimer, the term of this patent is extended or adjusted under 35 U.S.C. 154(b) by 29 days.

(21) Appl. No.: 18/665,460

(22) Filed: May 15, 2024

(65) Prior Publication Data

US 2025/0316176 A1    Oct. 9, 2025

Related U.S. Application Data

(60) Provisional application No. 63/518,194, filed on Aug. 8, 2023.

(51) Int. Cl.
*G08G 5/26* (2025.01)
*B64D 45/00* (2006.01)

(52) U.S. Cl.
CPC .............. *G08G 5/26* (2025.01); *B64D 45/00* (2013.01); *B64D 2045/0085* (2013.01); *B64D 2221/00* (2013.01)

(58) Field of Classification Search
CPC .. G08G 5/26; B64D 45/00; B64D 2045/0085; B64D 2221/00
See application file for complete search history.

(56) References Cited

U.S. PATENT DOCUMENTS

| 11,351,680 | B1* | 6/2022 | Rosenberg | B25J 19/0095 |
| 2003/0032426 | A1* | 2/2003 | Gilbert | H04B 7/18508 |
| | | | | 455/430 |
| 2003/0093187 | A1* | 5/2003 | Walker | B64D 45/0059 |
| | | | | 701/1 |
| 2011/0106858 | A1* | 5/2011 | Rieger | G06Q 10/107 |
| | | | | 707/E17.03 |
| 2018/0075757 | A1* | 3/2018 | Estes | G08G 5/32 |
| 2018/0180444 | A1* | 6/2018 | Cantaloube | G06F 3/0488 |
| 2019/0090800 | A1* | 3/2019 | Bosworth | A61B 5/0015 |
| 2020/0108925 | A1* | 4/2020 | Smith | B64U 70/30 |
| 2020/0140074 | A1* | 5/2020 | Hendricks | B64C 27/51 |
| 2020/0301422 | A1* | 9/2020 | Duda | G05D 1/101 |
| 2022/0063836 | A1* | 3/2022 | Walter | B64D 45/0056 |
| 2022/0135243 | A1* | 5/2022 | Arnold | B64D 45/00 |
| | | | | 701/3 |

(Continued)

OTHER PUBLICATIONS

International Search Report and Written Opinion issued in corresponding PCT Application No. PCT/US2024/052646 dated Dec. 31, 2024, pp. 1-20.

*Primary Examiner* — Donald J Wallace
*Assistant Examiner* — Jalal C Coduroglu
(74) *Attorney, Agent, or Firm* — Kevin Paganini, Esq.

(57) ABSTRACT

This disclosure relates to systems and methods for providing a copilot replacement system (CPRS) that enables dual-pilot or multi-pilot aircraft to be operated by a single onboard pilot. Amongst other things, the CPRS solutions can include components that autonomously execute functions traditionally performed by an onboard copilot and/or can establish connections with one or more copilot ground base stations (GBSs) that enable ground-based copilots to remotely provide assistance with operating the aircraft.

22 Claims, 8 Drawing Sheets

(56) References Cited

U.S. PATENT DOCUMENTS

| | | |
|---|---|---|
| 2022/0194576 A1 | 6/2022 | Yang et al. |
| 2023/0057709 A1* | 2/2023 | Naiman .............. G10L 15/1822 |
| 2023/0303246 A1* | 9/2023 | Moy ....................... B64C 19/00 |

* cited by examiner

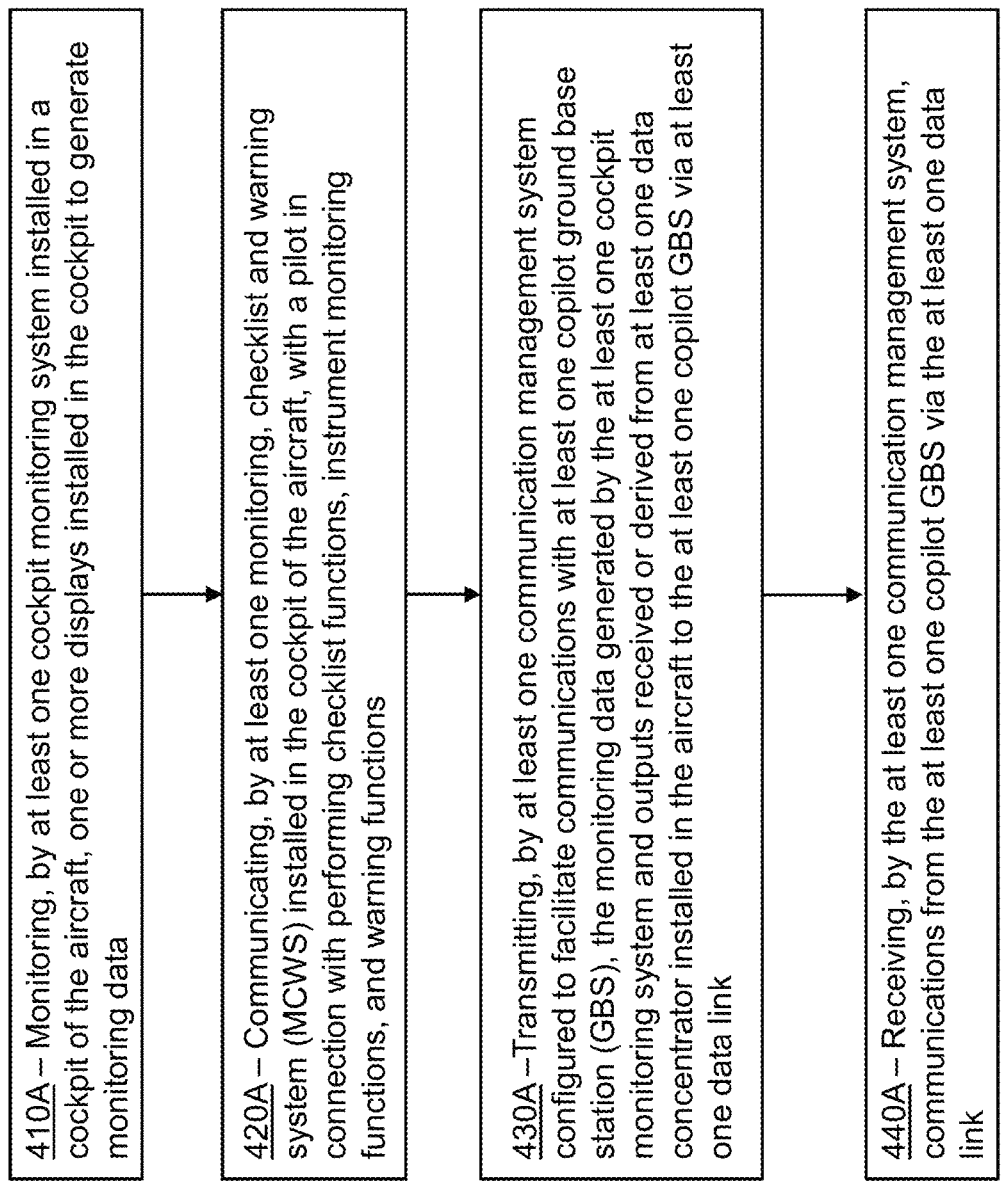

COPILOT REPLACEMENT SYSTEM AND RELATED METHODS

CROSS-REFERENCE TO RELATED APPLICATIONS

This application claims benefit of, and priority to, U.S. Provisional Patent Application No. 63/518,194 filed on Aug. 8, 2023. The content of the above-identified application is herein incorporated by reference in its entirety.

TECHNICAL FIELD

This disclosure describes, inter alia, improved systems, methods, and techniques for providing a copilot replacement system that enables aircraft to be operated by a single onboard pilot.

BACKGROUND

Various types of aircraft are designed to be operated by a crew of two pilots, such as a pilot and co-pilot. For example, in the United States, many commercial aircraft that are subject to certification regulations set forth under Part 25 of Title 14 of the Code of Federal Regulations (CFR) (sometimes referred to as "Part 25 aircraft") are certified to require two pilots. Likewise, many types of military aircraft (e.g., such as military transports) also are designed to be operated by two pilots.

Traditionally, aircraft designed for dual-pilot operations cannot be operated by a single pilot for a variety of reasons, including safety concerns, cockpit layout constraints, and certification requirements. For example, in many scenarios, the physical layout or design of a cockpit can make it impractical for a single pilot to operate an aircraft. This is because certain components (e.g., such as circuit breakers, control switches, displays, etc.) may be accessible to one pilot, but not easily accessible by the other pilot. Additionally, these dual-pilot aircraft are typically operated in a manner such that the duties of the pilot and copilot are segregated or divided to allow both pilots to be engaged during all phases of flight. For example, during certain phases of flight, a copilot may handle duties associated with callouts, managing checklists, and ensuring proper procedures are executed, while a pilot performs a primary role in controlling, navigating and maneuvering the aircraft. With respect to Part 25 aircraft, pilot roles are typically designated as "pilot flying" (e.g., which can correspond to the role performed by a pilot) and "pilot monitoring" (e.g., which can correspond to the role performed by a copilot). These physical and operational constraints can make it difficult for a single onboard pilot to operate a dual-piloted aircraft and, consequently, many certification agencies (e.g., the Federal Aviation Agency or FAA) will require a crew of at least two pilots to operate such aircraft.

BRIEF DESCRIPTION OF DRAWINGS

To facilitate further description of the embodiments, the following drawings are provided, in which like references are intended to refer to like or corresponding parts, and in which:

FIG. 4A is a flow chart for a method of operating a CPRS in accordance with certain embodiments.

Figure 1A:
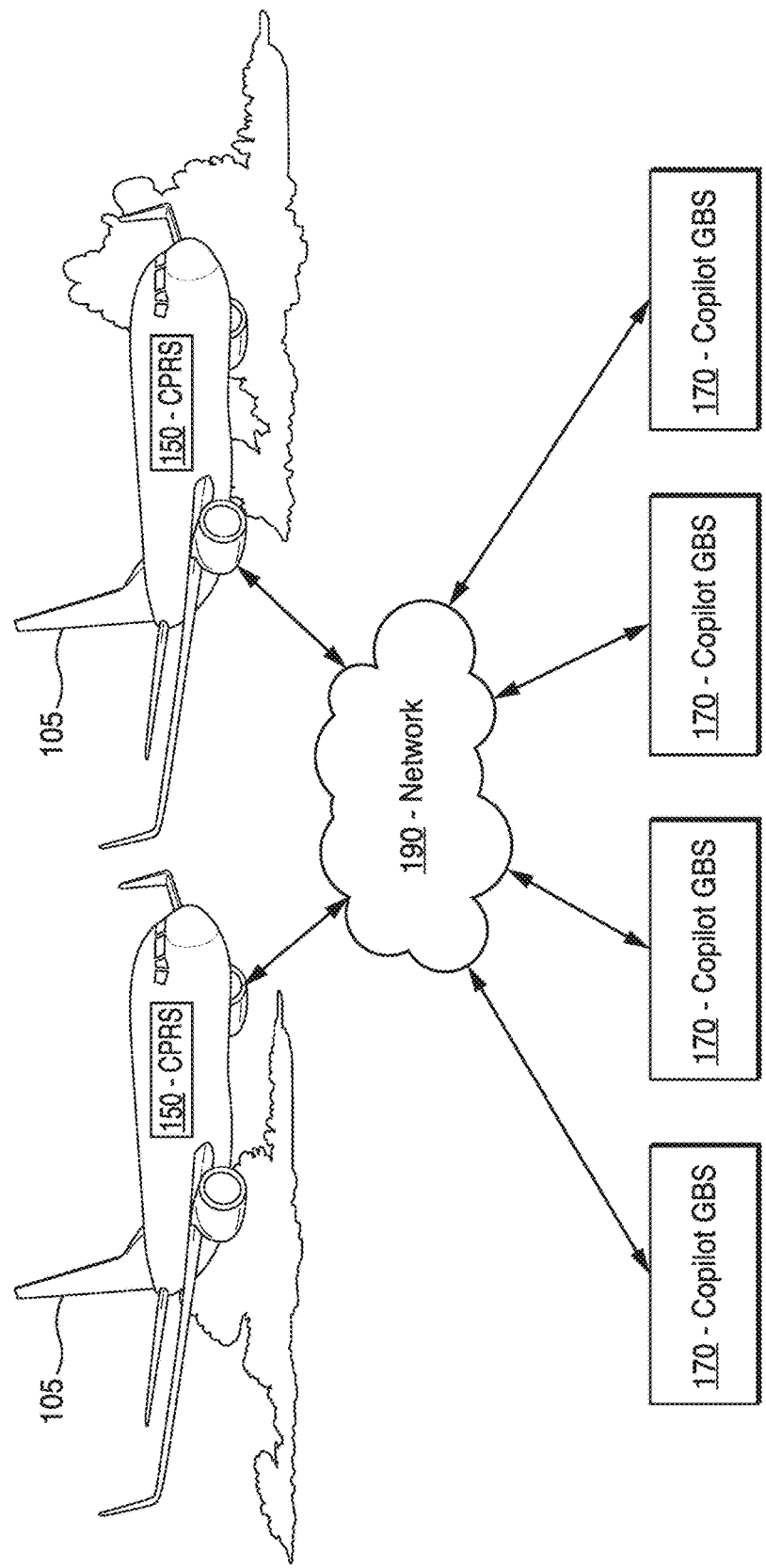
FIG. 1A is a block diagram of a system in accordance with certain embodiments.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "connect," "connected," "connects," "connecting," "couple," "coupled," "couples," "coupling," and the like should be broadly understood and refer to linking two or more elements or signals, electrically, electronically, mechanically and/or otherwise. Connecting/coupling may be for any length of time, e.g., permanent or semi-permanent or only for an instant. "Electrical connecting," "electrical coupling," and the like should be broadly understood and include connecting/coupling involving any electrical signal, whether a power signal, a data signal, and/or other types or combinations of electrical signals. "Mechanical connecting," "mechanical coupling," and the like should be broadly understood and include physical or mechanical connecting/coupling of all types.

The term "primary" in the description and in the claims, if any, is used for descriptive purposes and not necessarily for describing relative importance. For example, the term "primary" can be used to distinguish between a first component and an equivalent redundant component; however, the term "primary" is not necessarily intended to imply any distinction in importance between the so-called primary component and the redundant component. Unless expressly stated otherwise, any redundant component(s) should be treated as being able to operate interchangeably with any primary component(s) of the system, in tandem with any primary component(s), and/or in reserve for any primary component(s) (e.g., in the event of a component/system failure).

The terms "pilot," "co-pilot," "pilots," "co-pilots," "operator," "operators," or the like should be broadly understood to refer to any individual or user, and not necessarily to individuals who are certified to operate or fly aircraft. Additionally, while the term "copilot" may be used to refer to an individual who assists a primary pilot in some instances, it should be understood that a copilot may perform the same or similar functions or roles as a pilot in some scenarios. Thus, the terms "pilot" and "copilot" can be used interchangeably in this disclosure.

DETAILED DESCRIPTION OF EXEMPLARY EMBODIMENTS

The present disclosure relates to systems, methods, apparatuses, and techniques for providing a copilot replacement system (CPRS) that facilitates replacement of a copilot in traditional dual-pilot aircraft. Integration of the CPRS into these dual-pilot aircraft enables the aircraft to be operated by a single onboard pilot. As explained in further detail below, the CPRS solutions described herein can autonomously execute various functions traditionally performed by a copilot and can enable a remote, ground-based pilot to be connected to aircraft in various scenarios. Additionally, these CPRS solutions can include modified cockpit configurations that provide a pilot with direct access to components that are traditionally located on a copilot's area of the aircraft.

In certain embodiments, the CPRS can autonomously execute various functionalities that are traditionally performed by a copilot. Additionally, in certain embodiments, the CPRS can include a high-speed GND data link that establishes a connection with one or more copilot ground base stations (GBSs) to enable a remotely situated copilot to provide assistance in operating the aircraft. Examples of these autonomous and remotely assisted functionalities are described throughout this disclosure.

The CPRS can comprise components that are installed in various portions of an aircraft, such as a cockpit, electronic and equipment (EE) bay, and aircraft exterior. Amongst other things, the CPRS can include a monitoring, checklist and warning system (MCWS), cockpit monitoring system, communications management system, GND data links, a flight augmentation system, and an exterior vision system. Additionally, the CPRS can be directly or indirectly coupled to a variety of avionics components or devices, such as an aircraft's MCDUs (multi-function control and display units), data concentrators, flight management systems (FMSs), flight guidance computers (FGCs), multimode radios, flight and safety data computers (FSDCs), sensor systems, and/or cockpit displays, actuators, switches and controls. The data received from these components can enable the CPRS to autonomously perform various functionalities and/or can be relayed to a copilot GBS to provide a remote copilot with access to the data.

In many embodiments, the MCWS can be installed in the cockpit of an aircraft and can be configured to execute checklist functions, instrument monitoring functions, call out functions, warning functions, and other functions typically performed by an onboard copilot. The MCWS can output data or information associated with executing these and other functions on a display device situated proximate to the pilot. The display device permits the pilot to monitor, access, and control all of the functions typically performed by a traditional onboard copilot, and to monitor all instruments, data, and information that would typically be presented to an onboard copilot. Additionally, the MCWS can communicate with the pilot (via both audio and visual means) to provide information, warnings and alerts, and to facilitate performance of checklists, call outs, and other functions.

The CPRS solution also can enable a pilot to easily access and control various components, devices, switches, or controls that are traditionally located on a copilot's side of a cockpit. For example, any mechanical circuit breakers located in a copilot's area of a cockpit can be replaced with electronic circuit breakers that can be controlled by displays, switches or controls located adjacent to the pilot. Along similar lines, any control switches, displays, and/or instrument readings located in a copilot's area of the cockpit can be presented to, and controlled by, the pilot using displays, switches or controls located adjacent to the pilot.

The communications management system and/or GND data links can establish a connection to a copilot GBS, thereby enabling a remote, ground-based copilot to be connected to the aircraft during some or all phases of flight. This connection permits the remote copilot to control various functionalities of the aircraft and to assist the pilot in operating the aircraft. Additionally, a cockpit monitoring system installed in the cockpit of the aircraft can provide the remote copilot with visibility of the flight instruments, warning indicators, and other cockpit components, as well as provide a forward-facing view through the windshield of the aircraft. The copilot's visibility also can be supplemented with information from exterior vision systems (such as LiDAR and cameras located on the exterior of the aircraft). A headset connected to the copilot GBS can enable the remote copilot to audibly communicate with the pilot in performing various functions (e.g., checklists, call outs, etc.), and to communicate with other entities (e.g., air traffic controllers, other aircraft) over the aircraft's multimode radios.

In the event that an onboard pilot becomes incapacitated (or otherwise is unable to operate an aircraft), a flight augmentation system can execute functions that assist a remote copilot with landing the aircraft. Amongst other things, the flight augmentation system can enable the aircraft to be safely landed on approved surfaces (e.g., runways), as well as unapproved surfaces (e.g., open fields, roads, bodies of water, etc.) in emergency scenarios when instrument landing systems (ILSs) are unable to guide the descent and landing of the aircraft. In these scenarios, the flight augmentation system can generate simulated ILS signals and provide these signals to an autopilot function, flight guidance component, and/or flight management system to navigate and land the aircraft on an approved surface and/or an unapproved surface. Additionally, the flight augmentation system can generate augmented aircraft displays that annotate camera views with various objects to assist a copilot with monitoring landing operations on these surfaces. Further details of the flight augmentation system are provided below.

In certain embodiments, the CPRS may further include override controls that permit an onboard pilot to override control of the aircraft by any remote entities, such as a copilot GBS. In some scenarios, these override controls can reallocate control of the aircraft to the onboard pilot in the event that a data link is breached by a malicious actor and/or the pilot desires to more fully control certain operations of the aircraft. In some cases, the override controls can completely sever or disable a communication link to the remote entities. In other scenarios, the override controls can be utilized to restrict or limit control of the aircraft by the copilot GBS.

The CPRS technologies described herein provides a variety of benefits and advantages. Amongst other things, these technologies enable dual-piloted or multi-piloted aircraft to be operated by a single onboard pilot, rather than by a team of two or more pilots. The technologies described herein can provide a cost-effective solution of upgrading or retrofitting these aircraft with equipment that enables the aircraft to be operated by a single onboard pilot, which can be particularly beneficial in scenarios where there is limited availability of pilots.

Additional advantages can be attributed to the installation configuration of the CPRS, which provides the pilot with all access and control over all the equipment, devices, and functions typically provided to, or performed by, an onboard copilot. This can help overcome hurdles associated with traditional cockpit layouts or designs, such as those that impede the pilot's access to certain components.

Other advantages can be attributed to the ability of the CRPS to autonomously execute various copilot functions and/or communicate with the pilot in connection with performing these functions. Configuring the CPRS to execute these functions can eliminate, or at least mitigate, occurrences of human errors in operating aircraft.

Further advantages can be attributed to configurations that enable a remote copilot to be connected to the system during some or all phases of flight. The remotely connected copilot can provide assistance in various ways. In some scenarios, the remote copilot can be connected to the aircraft to mitigate the workload of the pilot and aid the pilot in performing various tasks (e.g., checklists, call outs, etc.). Additionally, in the event that a pilot becomes incapacitated or otherwise unable to operate an aircraft, the remote copilot can take control of the aircraft and ensure the aircraft is safely landed. These and other advantages are described throughout this disclosure.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

FIG. 1A is a block diagram of exemplary system 100A according to certain embodiments. The system 100A comprises one or more aircraft 105, each of which includes a copilot replacement system (CPRS) 150. The system 100A further includes one or more copilot ground base stations (GBSs) 170, and a network 190 that connects each of the one or more aircraft 105 to one or more of the copilot ground base stations (GBSs) 170.

As explained throughout this disclosure, the CPRS 150 installed in an aircraft 105 can be configured to execute various functions traditionally performed by a copilot and permits the aircraft 105 to be operated by a single onboard pilot.

Amongst other things, the CPRS 150 can communicate with an onboard pilot in connection with operating an aircraft 105, and can autonomously execute functions for performing checklists, instrument monitoring, call outs, and warnings. Additionally, the CPRS 150 can be configured to activate controls for autonomously navigating and landing the aircraft (e.g., in emergency scenarios).

Each aircraft 105 can be coupled or connected to one or more copilot ground base stations (GBSs) 170 over a network 190. The network 190 can include various types of air-to-ground communication networks. In some instances, the network 190 can comprise a SATCOM (satellite communication) network, a datalink communication network, a VHF (Very High Frequency) communication network, a HF (High Frequency) communication network, an ACARS (Aircraft Communications Addressing and Reporting System) network, an ATN (Aeronautical Telecommunication Network), a FANS (Future Air Navigation System) network, and/or other types of networks 190. The network 190 can further include, or be connected to, a local area network (e.g., a Wi-Fi network), a personal area network (e.g., a Bluetooth network), a wide area network, an intranet, the Internet, a cellular network, and/or other types of networks. Amongst other things, network 190 enables bi-directional communications between each aircraft 105 and one or more copilot GBSs 170.

Each copilot GBS 170 can be situated on the ground or the Earth's surface. Each copilot GBS 170 enables a remote copilot to be connected to one or more aircraft 105. The copilot GBS 10 can be connected to an aircraft 105 during any or all phases of flight (e.g., pre-flight, pushback and taxi, takeoff, climb, cruise, descent, approach, landing. taxi to the gate, shutdown and de-boarding, etc.) to aid an onboard pilot with operating an aircraft or performing related functions. The copilot GBS can enable the remote copilot to perform all actions or activities that could be performed traditionally by a copilot (or pilot) physically located on the aircraft 105. For example, the copilot GBS 170 can communicate with the CPRS 150 installed in the aircraft to perform functions such as scheduling, modifying, and executing flight plans, communicating with the onboard pilot, executing checklist functions, monitoring flight systems and warning indicators, maneuvering the aircraft, landing the aircraft, tuning radio or communication devices, communicating with the air traffic control and/or other aircraft, controlling autopilot, autothrust, and/or autoland functions, etc.

In some scenarios (e.g., such as when an onboard pilot becomes incapacitated or unable to operate an aircraft), the copilot GBS 170 can be used to control and operate all functionalities of the aircraft. Additionally, in these scenarios, the copilot GBS 170 can enable a remote copilot to activate and control autopilot and autonomous landing functions. In other scenarios, the copilot GBS 170 can play a more limited role that aids an onboard pilot with operating the aircraft (e.g., such as in scenarios involving heavy workloads). Additional details of the copilot GBS 170 are described in further detail below.

Figure 1B:
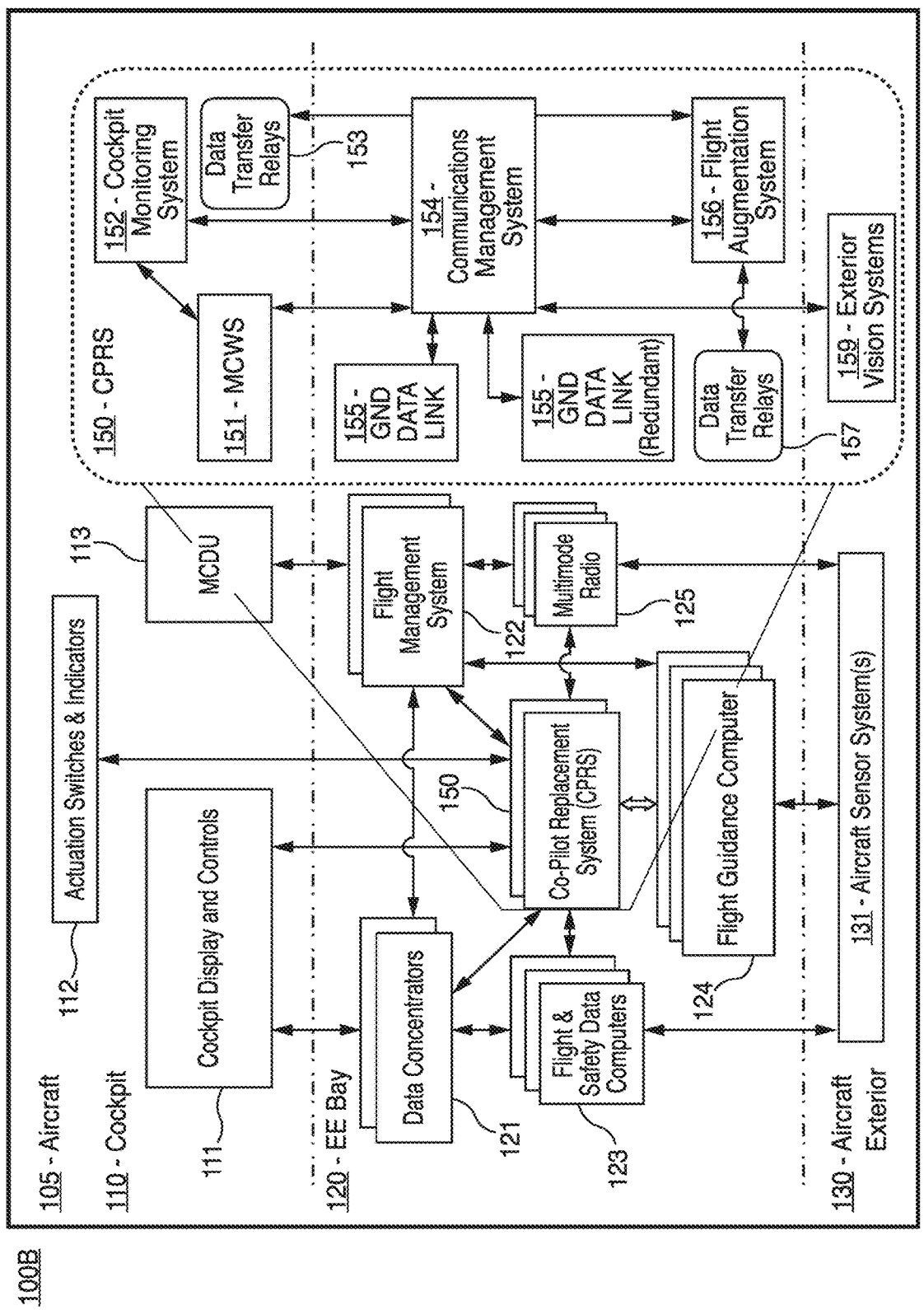
FIG. 1B is a block diagram of an exemplary aircraft system that includes a CPRS in accordance with certain embodiments.

FIG. 1B is a diagram of an exemplary aircraft system 100B that includes a CPRS 150 according to certain embodiments. In general, the aircraft system 100B may be installed in any type of airplane and/or other type of aircraft 105. In some examples, the aircraft system 100B may be installed in a commercial aircraft or military aircraft that was originally designed to be operated by at least two individuals (e.g., a pilot and a copilot), such as Part 25 aircraft in the commercial sector and/or military transport aircraft.

The aircraft system 100B includes a copilot replacement system (CPRS) 150 that enables an aircraft to be operated with a single pilot physically present within the aircraft. As explained in further detail below, the CPRS 150 can be directly or indirectly networked and/or interfaced with various components of the aircraft system 100B, and can execute or manage functions that are typically performed by a copilot during all phases of flight. In some embodiments, the CPRS 150 can operate independently to perform the roles and functions traditionally performed by the copilot. Additionally, or alternatively, the CPRS 150 can permit a remotely situated copilot located at a copilot GBS 170 to assist with operating the aircraft 105.

In some scenarios, an aircraft 105 that was initially designed to be operated by a crew of two pilots may be updated or retrofitted to include the CPRS 150, thereby enabling the dual-pilot aircraft to be operated with only a single pilot onboard the aircraft 105. In other scenarios, an original design of the aircraft 105 may be equipped with the CPRS 150.

As shown in FIG. 1B, various components can be installed in an aircraft 105 (e.g., such as components labeled as 111-113, 121-125, 131, 151-159, and 161) that are directly or indirectly coupled to, and interfaced with, the CPRS 150. The components of the aircraft 105 can be installed in various locations, such as in a cockpit 110, an electronic and equipment (EE) bay 120, and/or on or near an aircraft exterior 130. While FIG. 1B illustrates an exemplary arrangement for installing components within the cockpit 110, EE bay 120 and aircraft exterior 130, it should be recognized that the arrangement of these components can vary and locations of certain components can be changed or varied in some embodiments.

Additionally, while FIG. 1B illustrates the aircraft system 100B as including one of each of the component (e.g., such as components labeled as 111-113, 121-125, 131, 151-159 and 161) for simplicity purposes, it should be recognized that the aircraft system 100B can include any number of each component. For example, in some embodiments, the aircraft system 100B may include only one of each component. In other embodiments, the aircraft system 100B may include two or more of each component (e.g., such as to provide redundancy for various subsystems). A brief description of each of these components is provided below, along with examples of locations of where these components may be installed in the aircraft 105.

In certain embodiments, the cockpit 110 of the aircraft 105 can include, inter alia, cockpit display and controls 111, actuation switches and indicators 112, and/or one or more multi-function control and display units (MCDU) 113. As explained in further detail below, the cockpit 110 also can include certain components of the CPRS 150, including at least one monitoring, checklist, and warning system (MCWS) 151, at least one cockpit monitoring system 152, at least one data transfer relay 153, and at least one override control 161.

The cockpit display and controls 111 in the cockpit 110 can include various instruments, screens, and/or controls that provide a pilot with information about the aircraft's systems, flight parameters, and navigation, and allow the pilot to interact with and control various functions of the aircraft. These can include primary flight displays (PFDs) and other displays (e.g., weather radar displays, engine performance displays, fuel status displays, system status displays, navigational charts, etc.), as well as flight controls, power controls, avionics controls, etc. Exemplary cockpit display and controls 111 can include an airspeed indicator (ASI), attitude indicator (or artificial horizon), heading indicator (or directional gyro), turn coordinator (or turn and bank indicator), altimeter, vertical speed indicator (VSI), and/or other flight instruments.

Additionally, the cockpit display and controls 111 can be updated to include a display that enables the pilot to access and perform the functions that are typically only accessible by the copilot. For example, in some traditional cockpit layouts, certain instruments, screens, and/or controls, such as those that facilitate instrument comparisons, call outs, and checklists for emergency, normal and abnormal operations, only may be accessible to the co-pilot (or not easily accessible to the pilot). To account for this, the cockpit display and controls 111 for the pilot may include a display (e.g., MCWS 151) that enables the pilot to access and control these and other functions that are traditionally performed by the copilot. In certain embodiments, the display, which allows for performance of copilot functions, can be a dedicated display or additional display that is installed in the cockpit 110. Alternatively, the corresponding functionalities can be incorporated into an existing display (e.g., such as the MCDU 113 located on the pilot side of the cockpit 110).

Any or all of the cockpit display and controls 111 can be coupled to the CPRS 150 to permit bi-directional exchange information with the CPRS 150. This connection can enable the CPRS 150 to access, monitor, and control the cockpit display and controls 111 and/or actuation switches and indicators 112 in an automated or autonomous fashion and/or can enable a ground-based copilot connected to the CPRS 150 to access, monitor, and control the cockpit display and controls 111 and/or actuation switches and indicators 112. The cockpit display and controls 111 also can be coupled to other aircraft components, such as the data concentrators 121, to access various types of information as described below.

The actuation switches and indicators 112 in the cockpit 110 can be utilized used by the pilot to display and control various flight instructions, systems, and functions of the aircraft. Exemplary actuation switches and indicators 112 can be utilized to control landing gear, flaps, engines, autopilot functions, autothrottle functions, autonomous landing systems, lighting systems, communication systems, fuel selector systems, etc.

Additionally, the actuation switches and indicators 112 also include controls for manipulating physical equipment or components located on a copilot area of the aircraft 105. For example, in certain traditional cockpit layouts, one or more mechanical circuit breakers may be positioned on the copilot side of the cockpit 110, which is not easily accessible by the pilot. In this scenario, the mechanical circuit breakers can be replaced with electronic circuit breakers that are monitored, managed, and/or controlled by the actuation switches and indicators 112 located on the pilot side of the aircraft. The actuation switches and indicators 112 can similarly permit the pilot to monitor, manage, and/or control other types of components that are positioned on the copilot side of the cockpit in a similar manner. In some cases, a display provided on the pilot side of the cockpit (e.g., provided by components 111, 113, or 151) additionally, or alternatively, can be configured to monitor, manage, and/or control the circuit breakers and/or other physical components located on the copilot side of the aircraft 105.

The actuation switches and indicators 112 also can be coupled to the CPRS 150 to enable the CPRS 150 to monitor, manage, and/or control the physical components. This connection can enable the CPRS 150 to access, monitor, and control the actuation switches and indicators 112 in an automated or autonomous fashion and/or can enable a ground-based copilot connected to the CPRS 150 to access, monitor, and control the actuation switches and indicators 112.

The MCDU 113 in the cockpit 110 can provide a computer interface that permits pilots to input data and receive feedback about various aspects of the aircraft's operations, including fuel consumption, flight path, and altitude, and can be utilized to perform functions associated with flight planning, navigation, and performance computations. In some cases, the MCDU 113 can utilize data obtained from the FMS 122, FGC 124, and/or other the navigator system to perform these and other functions. Additionally, in some embodiments, the MCDU 113 can be configured with some or all of the aforementioned functionalities associated with performing functions traditionally performed by a copilot and/or controlling physical components situated on copilot side of the cockpit 110 (e.g., such as instrument comparison, call outs, checklist monitoring, etc.).

In some traditional cockpit layouts, the cockpit 110 may be outfitted with a pair of MCDUs 113 (e.g., a first MCDU 113 utilized by the pilot and a second MCDU 113 utilized by the copilot). In scenarios where the CPRS 150 is installed in the aircraft, the second MCDU 113 for the copilot can optionally be removed. Additionally, as explained in further detail below, an MCDU simulator can be installed at a copilot GBS 170 to provide a remote copilot located on the ground with the same information and functionality that traditionally would be provided to an onboard copilot located in the cockpit 110.

Each of the components included in the cockpit 110 (including the cockpit display and controls 111, actuation switches and indicators 112, and/or MCDUs 113) of the aircraft 105 can be directly or indirectly to the CPRS 150 to allow for bi-directional exchange of information between the CPRS 150. For example, the CPRS 150 can be coupled to the cockpit display and controls 111 to obtain data related to the aircraft's systems, flight parameters, and navigation, and to enable the CPRS 150 to manipulate corresponding settings for the displays and controls. Likewise, the CPRS 150 can be coupled to the MCDU 113 (either directly or indirectly via the FMS 122) to obtain data related to the aircraft's operations (e.g., fuel consumption, flight path, flight plan, altitude, attitude, etc.), and to enable the CPRS 150 to provide various inputs to the MCDU 113 (e.g., inputs for specifying a flight planning parameters, navigation, performance parameters, etc.). Additionally, the connections between the CPRS 150 and the actuation switches and indicators 112 can enable the CPRS 150 to activate/deactivate and/or control the aircraft's landing gear, flaps, engines, autopilot functions, autothrottle functions, lighting systems, communication systems, fuel selector systems, circuit breakers, etc. Any of the components connected to the CPRS 150 can be controlled by a remote copilot and/or autonomously controlled by the CPRS 150.

In certain embodiments, the EE bay 120 can include, inter alia, one or more data concentrators 121, one or more flight management systems (FMSs) 122, one or more flight and safety data computers (FSDCs) 123, one or more flight guidance computers (FGCs) 124, and/or one or more multimode radios 125. Each of the components included in the EE bay 120 (including the data concentrators 121, FMSs 122, FSDCs 123, FGCs 124, and multimode radios 125) of the aircraft 105 can be directly or indirectly coupled to the CPRS 150 to allow for bi-directional exchange of information. Additionally, as explained in further detail below, the EE bay 120 also may include certain components of the CPRS 150, including one or more communications management systems 154, one or more GND (ground) data links 155, one or more flight augmentation systems 156, and/or one or more data transfer relays 157.

Each data concentrator 121 can include a centralized computing device that collects, processes, and distributes data from various systems and components throughout the aircraft, thereby streamlining the flow of data and facilitating efficient communication between different avionics systems. Amongst other things, the data concentrator 121 gathers data from a wide range of sources (e.g., including FMS 122, FGC 124, FSDC 123, flight instruments, engine sensors, navigation systems, communication systems, and other avionics subsystems), and processes the data to ensure its integrity, accuracy, and compatibility. The data concentrator 121 can act as a central hub to distribute the processed data to the relevant systems, displays, or avionics units that require the information. The data concentrator 121 can be coupled to the CPRS 150 to enable the CPRS 150 to obtain the aforementioned data collected from the various aircraft sources (along with corresponding integrity and accuracy information), and to enable the data concentrator 121 to receive, process, and monitor data from the CPRS 150.

Each FMS 122 can include an onboard computer system that assists the flight crew in managing various aspects of flight planning, navigation, and guidance. Amongst other things, the FMS 122 enables the flight crew to input and optimize the aircraft's flight plan (e.g., while considering factors such as waypoints, airways, altitude constraints, weather conditions, performance characteristics, fuel consumption, etc.). In many cases, the FMS 122 receives data from various sources, such as GPS (Global Positioning System), VOR (VHF Omnidirectional Range), and/or IRS (Inertial Reference System) to determine the aircraft's position, track, and altitude, and it assists in accurately navigating the aircraft along the planned route, including tracking waypoints, avoiding obstacles, and conducting instrument approaches, while providing precise lateral and vertical guidance to the flight crew throughout the flight. Additionally, the FMS 122 also may interface with the aircraft's autopilot and autothrottle systems to automatically manage and/or control engine thrust and navigation of the aircraft.

The FMS 122 can be coupled to the CPRS 150, thereby enabling the CPRS 150 to access any or all of the aforementioned data generated by the FMS 122, and permitting the CPRS 150 to provide commands or inputs (e.g., relating to flight plans, autopilot/autothrottle systems, etc.) for controlling the FMS 122. The FMS 122 also can be coupled to a variety of other aircraft components, such as the MCDUs 113, data concentrators 121, FSDCs 123, and multimode radios 125.

Each FSDC 123 can include an onboard computer system that is configured to collect, process, and analyze flight data for safety and operational purposes. Amongst other things, the FSDC 123 can monitor and improve flight safety by recording and analyzing various parameters related to the aircraft's performance, systems, and crew actions, and can detect alerts related to various types of safety concerning events (e.g., excessive speed, altitude deviations, abnormal engine parameters, or other anomalies that may require immediate attention or action).

The FSDC 123 can be coupled to the CPRS 150 to enable the CPRS 150 to obtain any or all of the aforementioned data, and to enable the FSDC 123 to record and analyze actions taken by the FSDC 123. The FSDC 123 also can be coupled to the data concentrators 121, aircraft sensor systems 131, and/or other components of the aircraft 105.

Each FGC 124 can provide automated control and guidance functions to assist the pilot in flying the aircraft. Amongst other things, the FGC 124 can execute flight plans generated by the FMS 122, and can autonomously steer or direct the aircraft along the desired track, including following waypoints, airways, and instrument approaches. Additionally, the FGC 124 can perform functions that permit the pilot to engage and control the autopilot and autothrottle systems in controlling the aircraft, and can provide visual guidance cues on displays included in the cockpit 110 of the aircraft.

The FGC 124 can be coupled to the CPRS 150 to enable the CPRS 150 to obtain data (e.g., heading, flight plan, attitude, altitude, etc.) from the FGC 124 and/or manipulate or control of the functions performed by the FGC 124. The FGC 124 additionally can be coupled to the FMSs 122, aircraft sensor systems 131, and/or other components of the aircraft 105.

Each multimode radio 125 can include a radio communication system that is capable of operating on multiple frequency bands or modes, and can support both data and voice communications. The multimode radio 125 provides the flight crew with the ability to communicate with various ground-based and air-based entities (e.g., air traffic control, other aircraft, and ground-based stations) using various communication protocols. The specific functions and capabilities of a multimode radio can vary depending on the aircraft and its avionics system. In some cases, the multimode radio 125 can include VHF (Very High Frequency) communication capabilities, HF (High Frequency) communication capabilities, data link communication capabilities, Mode S transponder capabilities, and/or other communication capabilities.

The multimode radio 125 can be coupled to the CPRS 150 to enable the CPRS 150 to communicate with ground-based and air-based entities and/or to monitor communications with these entities. The multimode radio 125 additionally can be coupled to the FMSs 122, aircraft sensor systems 131, and/or other components of the aircraft 105.

In certain embodiments, the aircraft exterior 130 can include, inter alia, various aircraft sensor systems 131, each including one or more sensors and/or one or more actuators. Exemplary aircraft sensor systems 131 can include angle of attack (AoA) sensors, pitot tubes or sensors, static ports, temperature sensors, global position systems (GPSs), radar systems, radar altimeters, LIDAR (light detecting and ranging) systems, camera systems, antennas, wingtip devices, and/or other related components. As explained in further detail below, the aircraft exterior 130 also can be equipped with certain components of the CPRS 150, such as an exterior vision system 159 that includes one or more camera systems and/or one or more LIDAR systems (and/or alternative types of vision systems).

Each of the aircraft sensor systems 131 (and/or corresponding actuators) can be coupled to the CPRS 150 to enable the CPRS 150 to obtain data generated by these systems and/or control operation of these systems. The aircraft sensor systems 131 additionally can be coupled to the FSDCs 123, multimode radios 125, and/or other components of the aircraft 105.

As shown in FIG. 1B, the CPRS 150 can comprise various components installed throughout the cockpit 110, EE bay 120, and aircraft exterior 130. In certain embodiments, the cockpit 110 can include at least one MCWS 151, a cockpit monitoring system 152, one or more data transfer relays 153, and/or one or more override controls 161. The EE bay 120 can include a communications management system 154, one more GND (ground) data links 155, a flight augmentation system 156, and one or more data transfer relays 157. The aircraft exterior 130 also can be equipped with one more exterior vision systems 159. The CPRS 150 can include any number the aforementioned components (e.g., only one of each component or two or more of each component, such as to provide redundancy). A brief description of each of these components is provided below.

The CPRS 150 can include at least one MCWS 151 and, in many embodiments, a pair of MCWSs 151 for redundancy purposes. Each MCWS 151 can be directly or indirectly connected to any or all of the aircraft components (including any or all of the components in FIG. 1B), and can receive various types of data, information, and parameters from each of the components. Amongst other things, the MCWS 151 can utilize the data obtained from these components (e.g., data concentrators 121, FMS 122, FGC 124, etc.) to execute checklist functions, instrument monitoring functions, and warning functions. These functions can be provided via an output device accessible to the pilot (e.g., an interactive display provided by the cockpit display and controls 111, MCDU 113, and/or another device). While these functions are typically performed by an onboard copilot, the MCWS 151 can be located proximate to the pilot and can communicate with the pilot (e.g., via audio means, display means, and/or GUIs) to execute these functions.

In certain embodiments, the MCWS 151 can be configured in transition among an onboard control operational mode, an autonomous operational mode and a remote control operational mode. In the onboard control operational mode, a pilot may manually interact with and control the MCWS 151 to perform checklist functions, instrument monitoring functions, and warning functions. In the autonomous operational mode, the MCWS can independently or autonomously perform checklist functions, instrument monitoring functions, and warning functions, and can communicate directly with the onboard pilot to ensure that all corresponding flight procedures are adhered to and that the aircraft's instruments are within their operational parameters. In some embodiments, the autonomous operational mode can utilize algorithms and sensor integration to autonomously detect and alert the pilot to any anomalies or safety-critical information, effectively fulfilling the role of a copilot. In the remote control operational mode, the MCWS interfaces with a copilot ground base station (GBS), allowing a remotely situated copilot to access and control the MCWS functionalities. This mode enables the remote copilot to assist the onboard pilot by managing checklists, monitoring instruments, and issuing warnings. The MCWS's multi-mode capabilities help to ensure that the aircraft can be operated safely and efficiently, whether autonomously or with remote assistance, adapting to the varying demands of each flight scenario.

In some cases, the MCWS 151 may be configured in the onboard control operational mode or autonomous operational mode by default. When the pilot desires the assistance of a remote copilot, the MCWS 151 may be transitioned to the remote control operational mode. Similarly, after the checklist functions, instrument monitoring functions, and warning functions have been performed (or when the connection to the remote copilot has been terminated), the MCWS 151 may transition from the remote control operational mode back to the onboard control operational mode or autonomous operational mode.

The checklist functions executed by the MCWS 151 can provide a structured set of procedures used by the flight crew during various phases of flight. These checklists help ensure that critical tasks are completed in a systematic and thorough manner, reducing the risk of human error. Exemplary checklist functions can provide checklists covering a wide range of activities, e.g., such as pre-flight checks, pre-takeoff checks, in-flight checks, pre-landing checks, abnormal checks (e.g., such in scenarios of equipment, component, or aircraft malfunctions), normal checks, and emergency procedure checks. In some embodiments, the checklists can be displayed in electronic form on a screen and/or output display dedicated to the MCWS 151 (or on other screens and/or output devices located in the cockpit).

Traditionally, checklists are typically displayed on an output device located on the copilot's side of the cockpit. In the aircraft system 100B, the MCWS 151 can enable the pilot to access the checklist functions, and can permit the checklists to be displayed on an output device located on pilot's side of the cockpit.

In certain embodiments, during operation of an aircraft, the MCWS 151 can autonomously execute checklist functions that are traditionally performed manually by a copilot. For example, for each checklist, the MCWS 151 can be configured to output (e.g., via a speaker on the MCWS 151 or in the cockpit) step-by-step checklist instructions to the pilot, and receive confirmations (e.g., via a microphone or display device) that each checklist instruction has been completed in an appropriate manner. Additionally, or alternatively, a ground-based copilot that is remotely connected to the aircraft 105 via the CPRS 150 can access the MCWS 151 and communicate with the pilot to ensure completion of the checklists. For example, the ground-based copilot can verbally communicate with the pilot over a communication link (e.g., GND data link 155) to read out and confirm the checklist instructions.

The instrument monitoring functions executed by the MCWS 151 can obtain data from various aircraft instruments, sensors, and displays, and provide real-time or near real-time information on the aircraft's status and performance. This information assists the flight crew with making informed decisions, and ensuring that the aircraft operates within safe parameters. Amongst other things, the monitoring functions can monitor and/or display parameters or readings from flight instruments (e.g., flight parameters such as airspeed, altitude, vertical speed, attitude (pitch and roll), heading, and navigation data), engine instruments (e.g., parameters such as engine speed, temperature, pressure, and fuel consumption), fuel management systems (e.g., parameters such as quantity, distribution, and fuel flow rates), electrical system monitors (e.g., parameters indicating the status of various electrical components), and/or hydraulic system monitors (e.g., parameters indicating hydraulic pressure and hydraulic system health), and compare these parameters with benchmark values or ranges to determine whether the parameters are within acceptable operating ranges. While copilots traditionally perform functions of monitoring the aircraft's instruments and ensuring the instrument readings are normal, these functions can be performed by automatically or autonomously by the MCWS 151 and/or by a ground-based copilot in communication with aircraft 105.

The warning monitoring functions executed by the MCWS 151 can provide the pilot with visual and/or audio-based warnings, messages, callouts, and alerts, similar to how they would be verbally communicated from a co-pilot to a pilot. For example, in some embodiments, the MCWS 151 can analyze and/or compare instrument readings to identify abnormal operating parameters and, in response to detecting the abnormal operating parameters, the MCWS 151 can output (e.g., via a speaker or a display device) the warnings, messages, callouts, and alerts to the pilot and/or a ground-based copilot remotely connected to the aircraft 105.

The cockpit monitoring system 152 can include any type of system or device that is capable of monitoring one or more displays (e.g., instrument panels, display devices, etc.) located in the cockpit of the aircraft. The configuration of the cockpit monitoring system 152 can vary.

In some embodiments, the cockpit monitoring system 152 can comprise one or more camera devices that capture views inside the cockpit and/or in the front exterior of the aircraft 105. In some examples, the cockpit monitoring system 152 can include at least two forward-facing cockpit cameras, one of which is focused on the instrument panel in the cockpit and the other focused on the external view through the windshield of the aircraft 105.

Additionally, or alternatively, the cockpit monitoring system 152 can include data connections and/or devices that receive data directly or indirectly from one or more displays (e.g., instrument panel displays and/or other displays) located in the cockpit of the aircraft, and which relay the data from the one or more displays to the CPRS 150.

An additional cockpit monitoring system 152 can be installed for purposes of redundancy (e.g., which includes a second set of cameras to be used in the event of a primary cockpit monitoring system failure and/or which includes a second set of data connections to the CPRS 150).

In certain embodiments, the cockpit monitoring system 152 also can include image recognition software that is configured to detect various obstacles, hazards, and/or safety-impacting flight conditions. In one example, the image recognition software can analyze the video or image data collected by a camera focused on a windshield view to identify external hazards, such as approaching aircraft, birds, inclement weather conditions, and/or other hazards external to the aircraft. In another example, the image recognition software can analyze the video or image data collected by a camera focused on the aircraft's instrument panel to detect internal warnings, abnormal instrument conditions, caution indications, and/or the like. Additionally, the cockpit monitoring system 152 (or other component) can provide warnings or alerts to the pilot (e.g., audibly via speakers and/or visually via a display device) based on detecting these obstacles, hazards, and/or safety-impacting flight conditions.

Any appropriate image recognition software can be utilized for the purposes described herein. In certain embodiments, the image recognition software can utilize one or more neural network models and/or one or more deep learning models to detect the obstacles, hazards, and/or safety-impacting flight conditions. These learning models can comprise a convolutional neural network (CNN), or a plurality of convolutional neural networks, that are configured to execute object detection functions associated with identifying the aforementioned obstacles, hazards, and/or safety-impacting flight conditions. For example, the object detection functions can be executed on the video or image data to identify exterior obstacles (e.g., corresponding to aircraft, birds, weather conditions, etc.) and interior instrument settings that indicate warnings, abnormal instrument conditions, caution indications, and/or the like. In some embodiments, the CNN (or other computer vision model) can be pre-trained in a supervised fashion using a training set of images that are labeled to identify the obstacles, hazards, and/or safety-impacting flight conditions.

Additionally, for embodiments in which the cockpit monitoring system 152 comprises one or more cameras, the video and/or images captured by the cameras of the cockpit monitoring system 152 can be transmitted (e.g., via GND data link 155) to the ground-based copilot station. The video or image feeds captured by cockpit monitoring system 152 can be output on one or more display devices located in the ground-based copilot station to enable a remotely situated copilot to view the instrument panel and/or exterior view of the aircraft 105.

Additionally, for embodiments in which the cockpit monitoring system 152 comprises data connections directly coupled to the instruments or displays in the cockpits, the data obtained via these connections can be transmitted (e.g., via GND data link 155) to the ground-based copilot station. The data can be output on one or more display devices (e.g., such as one or more simulated display devices) located in the ground-based copilot station to enable a remotely situated copilot to access data relating to the instrument panel and/or exterior view of the aircraft 105.

The data transfer relays 153 located in the cockpit 110 of the aircraft 105 can allow a ground-based copilot to manipulate (e.g., activate/deactivate, adjust settings, modify, alter, etc.) various switches and controls located in the cockpit 110. In some examples, the data transfer relays 153 enable the ground-based pilot to remotely manipulate switches or controls located in the cockpit, such as, e.g., the actuation switches and indicators 112 for controlling landing gear, flaps, engines, autopilot functions, autothrottle functions, autonomous landing systems, lighting systems, communication systems, fuel selector systems, electronic circuit breakers, etc. In further examples, the data transfer relays 153 can enable the ground-based pilot to remotely manipulate the MCWS 151 and/or cockpit monitoring system 152.

The communications management system 154 allows for bi-directional communication between the aircraft 105 and one or more ground-based copilot stations 170. The communications management system 154 comprises, or is coupled to, at least one GND data link 155, which can include a high-speed satellite communication device and/or other appropriate communication device. In certain embodiments, the aircraft system 100B can include two communications management systems 154 (each having a separate GND data link 155) for redundancy purposes.

In certain embodiments, the communications management system 154 is coupled to, and receives all data generated by, the data concentrators 121, as well as the video or image data from the cockpit monitoring system 152. The communications management system 154 can utilize the one or more GND data links 155 to transmit the video/image data (or other data obtained directly from the instruments and displays) from the cockpit monitoring system 152 and the data from the data concentrators 121 to the ground-based copilot station. Additionally, any data generated by other components of the aircraft system 100B (e.g., cockpit display and controls 111, actuation switches and indicators 112, MCDS, 113, FMS 122, FSDCs 123, FGC 124, multimode radios 125, aircraft sensor systems 131, MCWS 151, flight augmentation system 156, data transfer relays, etc.) also can be provided to the communications management system 154, and transmitted to the ground-based copilot station via one of the GND data links 155.

The communications management system 154 also is configured to receive various communications and control commands from ground-based copilot stations in communication with the aircraft 105. Various types of communications and control commands can be received from a copilot GBS 170 to permit the remote copilot to seamlessly perform the functions of a traditional copilot that is located in the cockpit 110. In general, the control commands received from the copilot GBS 170 can be utilized to communicate with, and control, any of the aircraft components illustrated in FIG. 1B (e.g., (e.g., such as components 111-113, 121-125, 131, and 151-159, etc.)

In some examples, the GND data link 155 can receive audio data from the ground pilot to facilitate verbal or audio communications with the pilot in the cockpit 110, air traffic controllers, and/or other aircraft located near the aircraft 105. In further examples, the GND data link 155 can receive control commands from a MCDU or simulated MCDU located at the copilot GBS 170 (e.g., such as MCDU commands that allow the remote copilot to control the FMS 122, FGC 124, and/or other aircraft components). In further examples, the GND data link 155 can receive control commands that enable the copilot to adjust or manipulate the cockpit display and controls and 111 and actuation switches and indicators 112 in the cockpit 110. Additionally, one or more data transfer relays 153 situated in the cockpit can allow the copilot to remotely control these components. Many other types of communications and control commands also can be received from the ground-based copilot.

For redundancy purposes, the communications management system 154 can comprise two high-speed satellite communication devices, as well as a HF radio device and/or a high-orbit satellite communication device. While the backup HF radio may provide low-resolution image or video data to the copilot GBS 170 pilot (e.g., due to limited bandwidth and slower communications), the data from the backup HF radio can be fused with the primary feeds and can be also utilized as primary communication device in case of a total failure of both high-speed satellite feeds.

The CPRS 150 can further include an exterior vision system 159 that supplements the aircraft sensor systems 131 on the exterior of the aircraft 105. Amongst other things, the exterior vision system 159 can include one or more additional cameras and/or one or more LiDAR (light detecting and ranging) systems. In certain embodiments, the exterior vision system 159 can include an infrared (IR) camera, a high-resolution video camera, and a LIDAR system. A second IR camera, second high-resolution camera, and second LiDAR system can be provided for redundancy. Any data captured by the exterior vision system 159 can be output on a display device to copilot located at a copilot GBS 170 and/or on a display device located in the cockpit 110. The exterior vision system 159 can be configured to capture various exterior environment data outside the aircraft 105, such as data identifying obstacles (e.g., other aircraft or objects) in the aircraft's flight path and/or in the vicinity of the aircraft.

Amongst other things, the visual data obtained by the exterior vision system 159 can be utilized to execute distance-measuring functions, which determine the distance to objects (e.g., other aircraft, obstacles, etc.) captured in the vision data. In certain embodiments, visual data captured by a pair of cameras can be utilized to determine a reference dimension for an object captured in the visual data. Additionally, or alternatively, the visual data captured by the LiDAR system can be utilized to determine the reference dimension. This reference dimension information can then be utilized to calculate distances between the aircraft 105 and the objects.

Additionally, the sensor or visual information data obtained by the exterior vision system 159 can combined or fused, and transmitted to a copilot GBS 170 over GND data link 155 to enable a ground-based copilot to determine the locations and distances of any objects captured by the cameras. For example, in certain embodiments, the copilot GBS 170 can output the image or video data captured by any of the aircraft cameras having external views (e.g., including any cameras included in the cockpit monitoring system 152 and/or exterior vision system 159) on a display device. When the image or video data is displayed, the copilot can select (e.g., using a mouse, touchscreen, or other input device) a location or object in the image or video data to obtain the distance of the aircraft 105 to the selected location or object. The reference information collected by the exterior vision system 159 can be utilized to calculate the distance to the location or object. In this manner, a remote copilot can easily determine and assess distances between the aircraft 105 and other objects or locations.

In certain embodiments, the CPRS 150 can further include a flight augmentation system 156 that, inter alia, executes functions to aid a ground-based based copilot in landing the aircraft 105. In some embodiments, the aircraft 105 can be equipped with two flight augmentation systems 156 for redundancy purposes. The flight augmentation system 156 can be activated and deactivated from a copilot GBS 170 in communication with the aircraft 105. Additionally, control of the flight augmentation system 156 (and any other components accessible by the copilot GBS 170) can be overridden by the pilot (or denied by the pilot) using onboard controls available in the cockpit 110 (e.g., which can be useful in the event that the data link security is breached).

When activated, the flight augmentation system 156 permits the remotely situated copilot to control and deploy various aircraft surfaces, equipment, and gear (e.g., such as landing gear, flaps, slats, air brakes, engine reversers, ground breaks, steering, etc.) for safely landing the aircraft and taxiing the aircraft off the runway after landing. In certain embodiments, one or more data transfer relays 157 located in the EE bay 120 can facilitate activation/deactivation of the flight augmentation system 156 and transfer control of the aircraft surfaces, equipment, and gear to the ground-based copilot. This can be beneficial in various scenarios, such as when the pilot becomes incapacitated or is otherwise unable to operate the aircraft 105.

In many scenarios, the flight augmentation system 156 may enable a remotely situated copilot to identify and selected an approved surface (e.g., a runway) for landing the aircraft 105.

In some scenarios (e.g., such as when aircraft components fail or emergency situations arise), the copilot may decide the safest option for landing the aircraft 105 is to select an unapproved surface for landing the aircraft 105 (e.g., such as a random parcel of land, a highway, or a body of water). As explained below, the flight augmentation system 156 provides several enhanced functionalities that enable the aircraft to be safely landed on the unapproved surface.

Some aircraft may be equipped with an autoland system that is configured to autonomously land the aircraft in certain situations. In traditional configurations, the autoland system uses instrument land system (ILS) signals received from a ground-based navigation system located at airports or approved runways to guide the aircraft during final approach and landing phases. Typically, the ground-based ILS generates localizer (LOC) signals for lateral guidance of the aircraft (e.g., to align the aircraft with a centerline of the runway) and glide scope (GS) signals for vertical guidance (e.g., to facilitate a steady descent path towards the touchdown zone on the runway). These signals are received by ILS receivers on the aircraft, and utilized by the autoland system to autonomously guide and land the aircraft. For example, the autoland system may utilize the autopilot system onboard the aircraft to control the aircraft's flight path using the ILS signals (e.g., to adjust the aircraft's heading and pitch to align it with the centerline of the runway and establish the correct glide path for landing), while the FMS 122 and/or FGC 124 calculates and manages the aircraft's approach, descent and landing profiles using the ILS signals. Additionally, in scenarios where in aircraft is in close proximity to the ground, the autoland system also may utilize radar altimeters onboard the aircraft to facilitate or execute aircraft flare maneuvers during the autonomous landing process.

In various scenarios (e.g., such as when a pilot becomes incapacitated or unable to operate the aircraft 105), the ground-based copilot can activate and control the autoland system in the aircraft to safely land the aircraft on an approved surface or runway. Once activated, the autoland system can utilize the ILS signals described above to navigate the aircraft to the approved surface and safely land the aircraft 105.

In scenarios when the aircraft is landing on an unapproved surface or runway, no ILS system (or corresponding signals) is present to safely guide the aircraft for landing. To account for this, the flight augmentation system 156 can be configured to generate simulated ILS control signals that emulate the ILS control signals that are generated by a ground-based ILS. These simulated ILS control signals can then be transmitted from the flight augmentation system 156 to the autopilot system, FMS 122 and/or FGC 124 (and other aircraft components), and utilized by the autoland system to navigate the aircraft to a designated touchdown location and land the aircraft on an unapproved surface. In this manner, the autoland system utilizes the simulated ILS control signals to safely navigate the aircraft towards the touchdown zone and land the aircraft on the unapproved surface, even though a ground-based ILS is not located within the range of the unapproved surface.

The simulated ILS control signals generated by the flight augmentation system 156 can include, inter alia, simulated glide scope signals that provide vertical guidance for navigating the aircraft 105 and simulated localizer signals that provider lateral guidance for navigating the aircraft 105. In certain embodiments, the flight augmentation system 156 can continuously generate and output the simulated glide scope signals and simulated localizer signals for usage by the autoland system, FMS 122, FGC 124, and/or other aircraft components during the approach and landing phases of flight. Other types of simulated control signals also may be generated by the flight augmentation system 156 for controlling the autoland system, FMS 122, FGC 124, and/or other components utilized to land the aircraft 105.

In some embodiments, the simulated ILS control signals can be generated, at least in part, using the information derived from the aircraft's sensing systems, such as sensor systems 131 and/or exterior vision system 159. As explained above, these sensing systems can include various types of devices (e.g., such as LiDAR systems, cameras, GPSs, etc.), and the data from these devices can be utilized to determine and track the three-dimensional (3D) coordinates or location of the aircraft 105, as well as the location of the touchdown zone on the unapproved surface. In turn, the location and reference information derived from the sensing systems, can be utilized to generate the simulated ILS controls signals that are utilized to navigate and land the aircraft.

In some embodiments, the flight augmentation system 156 also may generate simulated radar altimeter signals when the aircraft is in close proximity to the ground, and the simulated radar altimeter signals can be utilized by the autoland system to execute various types of aircraft flare maneuvers. The aircraft flare maneuvers can assist with reducing the aircraft's descent rate and bringing the aircraft to a smooth touchdown, and different aircraft flare maneuvers can be performed or executed based on the type of landing surface at the touchdown location (e.g., based on whether the aircraft is being landed on a grass field, body of water, etc.). In scenarios where the aircraft is landing on an unapproved surface, the simulated radar altimeter signals (and corresponding flare maneuvers) can be adjusted by the flight augmentation system 156 to accommodate the type of landing surface at the touchdown location.

In certain embodiments, certain aircraft 105 may not be pre-equipped with an autoland system. In this scenario, the flight augmentation system 156 can be configured with autoland functions, which can be utilized to navigate and land the aircraft in the same manner described above. Additionally, or alternatively, the flight augmentation system 156 can utilize the simulated ILS control signals to directly control the FMS 122, FGC 124, and/or other aircraft components in the same manner as would be done by an autoland system.

Additionally, the flight augmentation system 156 also can generate enhanced aircraft displays to aid a remote copilot situated at a copilot GBS 170 in monitoring and controlling a landing of the aircraft on unapproved surfaces or runways. For example, in some scenarios, the flight augmentation system 156 can generate an augmented reality (AR) display that emulates or simulates the landing of the aircraft on an approved runway (e.g., such as by augmenting a camera feed or display with a runway object overlay), despite the fact that the aircraft is being landed on an unapproved surface or runway. FIG. 3C, which is described in further detail below, illustrates an exemplary aircraft display that can be generated by the flight augmentation system 156.

The configuration of the augmented displays generated by the flight augmentation system 156 can vary. In some examples, the flight augmentation system 156 can generate a display that augments a camera view with a runway object on an unapproved surface where the aircraft is designated to land. Additionally, or alternatively, the camera view can be augmented with an object identifying the outline or perimeter of a runway on the unapproved surface. The camera view also can be augmented with other indicators and/or parameters, such as those that identify a designated touchdown point on the surface, obstacles located on or near the touchdown zone, aircraft parameters (e.g., altitude, speed, angle of attack, attitude, etc.).

In some cases, one or more of objects augmented into the camera view can be provided in a manner that enables the remote copilot to view the unapproved surface intended for landing (and to identify obstacles, such as holes, trees, or animals, on the surface). For example, if a runway object is added to the camera view, the runway object can be semi-transparent to permit the remote copilot to view the surface. In the event that the remote copilot identifies obstacles on the surface that raises safety concerns during landing, the copilot can transmit commands to the CPRS 150 (e.g., flight augmentation system 156) to cancel the landing on the unapproved surface and/or to select a new, safer surface for landing.

In certain embodiments, the CPRS may further include override controls 161 that permit an onboard pilot to override control of the aircraft by any remote entities, such as a copilot GBS 170 and/or a malicious actor that has intercepted or breached one or more of the GND data links 155. These override controls can reallocate control of the aircraft 105 to the onboard pilot and/or prevent remote entities from access or controlling the aircraft 105. In some cases, the override controls 161 may disable or deactivate the GND data links 155 to completely sever links to any remote entities.

Additionally, the override controls can be utilized to restrict or limit the control of the aircraft by a copilot GBS 170. In certain embodiments, the override controls can permit a pilot to provide selective access to any aircraft component (including, but not limited to any, any aircraft component illustrated in FIG. 1B or mentioned in this disclosure) and/or restrict access to any desired aircraft component (including, but not limited to any, any aircraft component illustrated in FIG. 1B or mentioned in this disclosure). In one example, the override controls may enable the onboard pilot to limit the role of remote copilot to certain functions, such as assisting with instrument monitoring, checklist, and/or warning functions (while restricting the remote copilot's access to other aircraft components and avionics systems that enable control of the aircraft's maneuvers, flight plans, and/or flight paths). In other examples, the override controls may enable the onboard pilot to control and access aircraft components and avionics systems during certain phases of flight, but may restrict or eliminate such control or access during other phases of flight.

Figure 2:
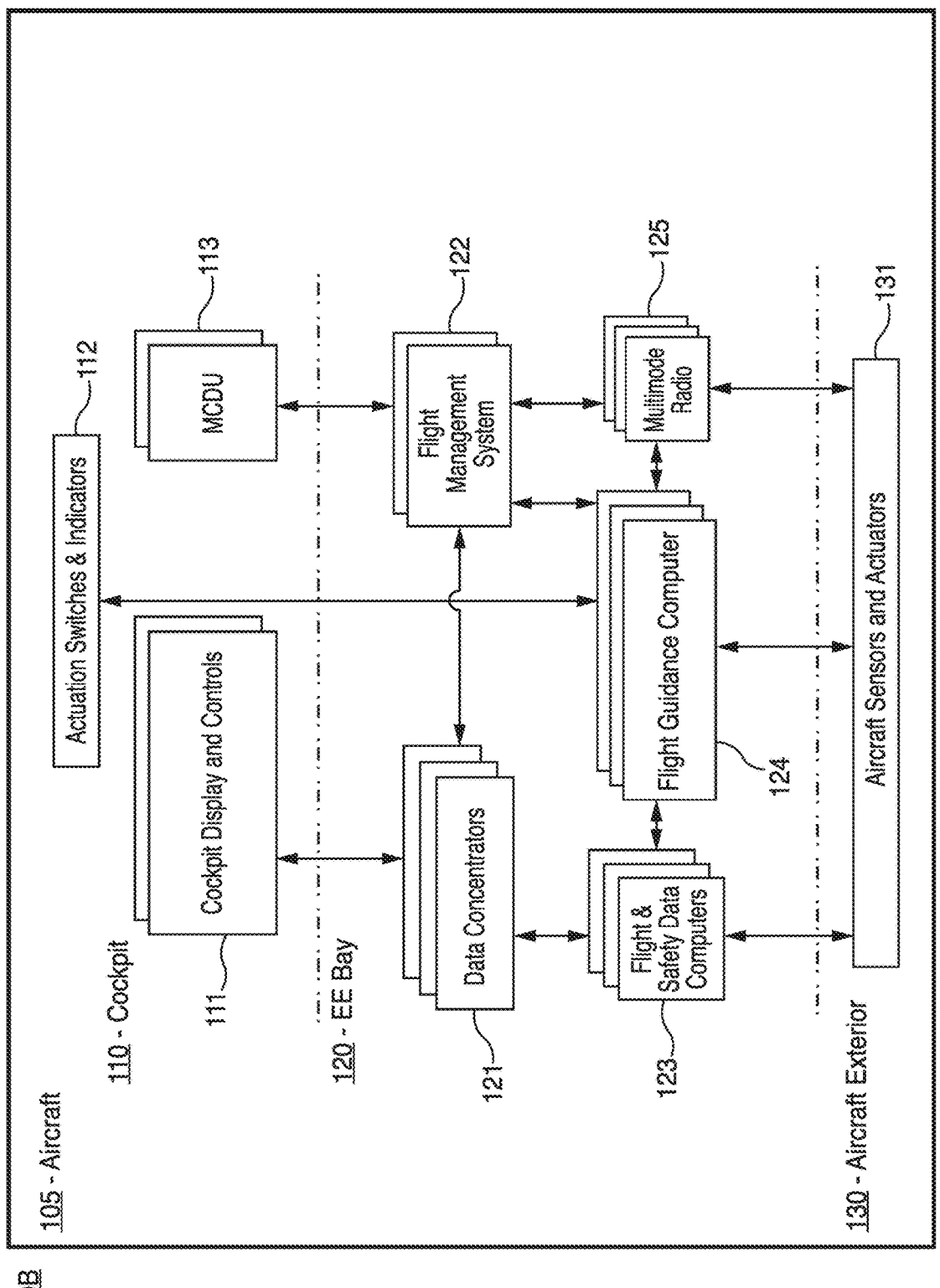
FIG. 2 is a block diagram of an exemplary aircraft system that does not include a CPRS.

FIG. 2 illustrates a system 1000 for an aircraft 105 that does not include the CPRS 150. This alternative system 1000 demonstrates how various avionics or aircraft components may be coupled, or connected, to each other some typical arrangements. The arrangement of avionics or aircraft components does not permit a single onboard pilot to operate the aircraft safely, nor does it permit a remote, ground-based copilot to assist with operating the aircraft. In jointly viewing FIGS. 1B and 2, one of ordinary skill in the art would understand how the various components of the CPRS 150 can be installed and coupled to existing avionics or aircraft components to provide the enhanced functionalities described herein.

Figure 3A:
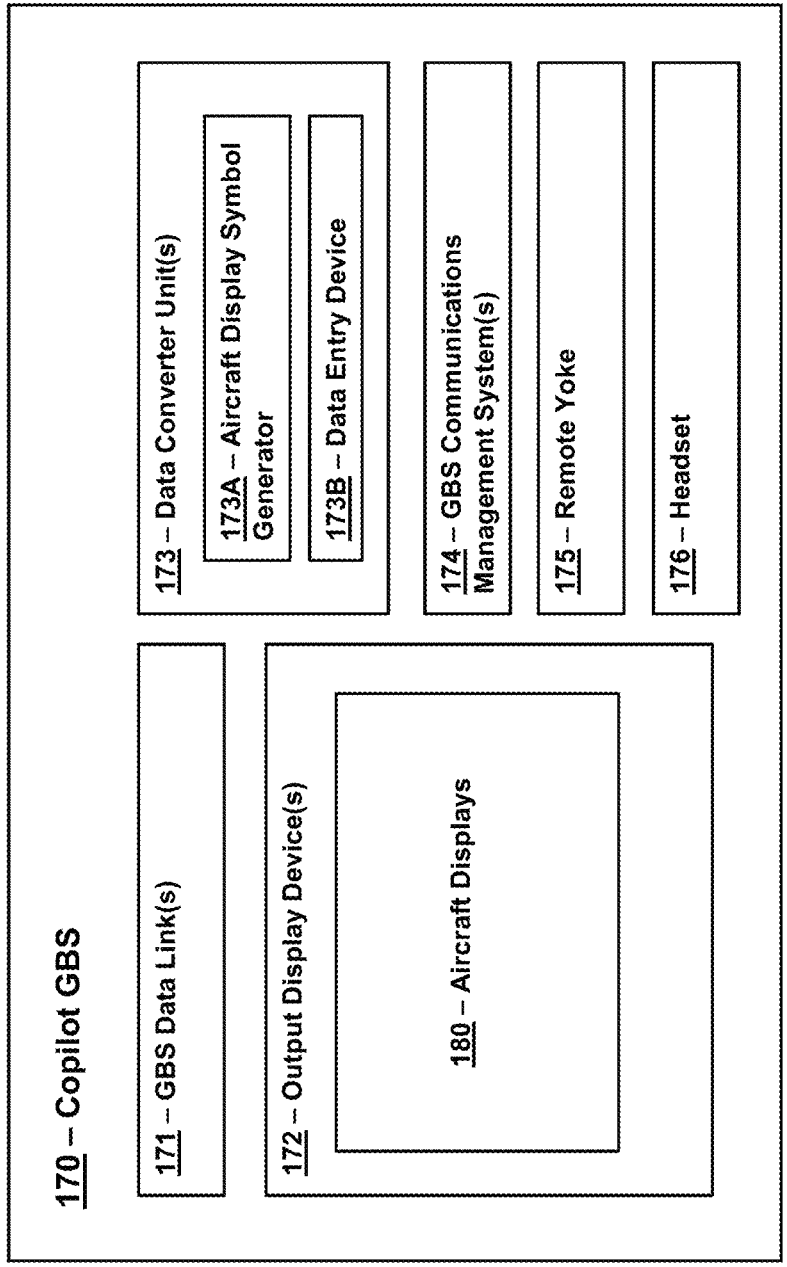
FIG. 3A is a block diagram of a copilot GBS in accordance with certain embodiments.

FIG. 3A is a block diagram demonstrating exemplary features of a copilot GBS 170 according to certain embodiments. Amongst other things, the copilot GBS 170 can include one or more computing devices, one or more GBS data links 171, one or more output display devices 172, one or more data converter units (DCUs) 173, one or more GBS communication management systems 174, one or more remote yokes 175, and/or one or more headsets 176. It should be understood that any of these components can be omitted from the copilot GBS 170 and/or additional components can be added to supplement the functionality of the copilot GBS 170.

The GBS datalink 171 and the GBS communication management system 174 can enable the copilot GBS 170 to communicate with various aircraft 105 (e.g., can communicate with data link 155 located on the aircraft and communication management system 154 on the aircraft). For example, as explained above, the GBS datalink 171 and the GBS communication management systems 174 can enable bi-directional communication between the copilot GBS 170 and an aircraft over a network 190, such as one that comprises a SATCOM network, a datalink communication network, a VHF communication network, a HF communication network, an ACARS network, an ATN, a FANS network, a local area network, a personal area network, a wide area network, an intranet, the Internet, a cellular network, and/or other types of networks. In certain embodiments, the GBS datalink 171 and the aircraft data link 155 can comprise high-speed satellite communication devices that communicate with each other over the network 190.

The GBS communication management system 174 can perform the same or similar functions as the communication management system 154 located on the aircraft, but can operate in a reverse fashion to transmit data to, and receive data from, the aircraft 105. Amongst other things, the GBS communication management system 174 can be coupled to an output display device 172 (and/or a computing device connected to the output display device 172) to receive control commands input or specified by a copilot located at the copilot GBS. The GBS communication management system 174 also can receive audio communications from the copilot (e.g., via headset 176 and/or a microphone). The GBS communication management system 174 can relay these commands and audio communications to the GBS datalink 171 for transmission to an aircraft 105 coupled to the copilot GBS 170 over the network 190.

The copilot GBS 170 further includes one or more output display devices 172 (e.g., which can include computer monitors, displays screens, and/or any other devices capable of displaying data or information). The output display devices 172 can generate and display various aircraft displays 180 to a copilot located at the copilot GBS 170, which can enable the copilot to remotely monitor an aircraft's operations, communicate with the pilot on the aircraft 105, transmit commands to the aircraft 105, and execute various functions in connection with operating the aircraft 105. In some embodiments, these aircraft displays 180 can be presented on graphical user interfaces (GUIs) and the copilot can interact with the GUIs to transmit communications, control commands, and/or other data to the aircraft 105.

In some embodiments, the copilot GBS 170 can comprise one or more computing devices (e.g., desktop computing devices, laptops, etc.). The one or more computing devices can execute some or all of the functions performed by the copilot GBS 170 (e.g., generating aircraft displays 180, receiving commands from pilots, receiving and transmitting data to and from the aircraft 105, etc.). The output display devices 172 (and DCU 173) can be connected to the one or more computing devices and/or can be integrated with the one or more computing devices. The one or more computing devices can be connected to Internet, which can be part of network 190. In certain embodiments, communications between the copilot GBS 170 and the aircraft 105 can be routed via the Internet and one or more connected SATCOM networks. In some scenarios, communications between the aircraft 105 and the copilot GBS 170 can be protected using a virtual private network (VPN) that includes a secure Internet hardware protocol. All communications over the network 190 can be protected using various encryption and cybersecurity protocols (e.g., such as to protect against intercept, manipulation, or denial of service).

The copilot GBS 170 further includes one or more DCUs 173 and, in some cases, a pair of DCUs for redundancy purposes. Each DCU 173 can be configured to receive some or all of the data transmitted over the network 190 from aircraft 105 to the copilot GBS 170. The DCU 173 can parse the data into different segments for generating the aircraft displays 180 and/or and can convert the data to formats that can be processed by the copilot GBS 170 and/or utilized to generate the aircraft displays 180 on an output display device 172.

In some examples, the DCU 173 can receive data from the aircraft's sensor systems, avionics, instruments and/or other components, and can include an aircraft display symbol generator 173A that is configured to generate visual representations of that data in the form of symbols, graphics, and/or text for the aircraft displays 180 (e.g., such as displays that visualize the aircraft's primary flight displays (PFDs), MCDUs, and/or other cockpit instruments). In further examples, the DCU 173 can be configured to perform the same or similar operations as the data concentrators 121 located on the aircraft 105 (e.g., such as collecting, processing, and distributing data from various systems, components, and aircraft displays). Additionally, in some embodiments, the DCU 173 can operate in a reverse fashion to convert data generated from the copilot GBS 170 for transmission to the aircraft 105 in a format that is usable by the aircraft's systems.

In certain embodiments, each DCU 173 also may include a data entry means 173B (e.g., a keypad and/or other input device) that enables the remote copilot to identify an aircraft 105 (e.g., by inputting a tail number of the aircraft 105). The remote copilot can utilize the data entry means to select an aircraft 105, and establish a connection between the selected aircraft 105 and the copilot GBS 170 over the network 190. Additionally, or alternatively, the data entry means 173B may include one or more GUIs presented on the output display devices 172 can be enable the remote copilot to select the aircraft 105, and establish the connection between the selected aircraft 105 and the copilot GBS 170.

The copilot GBS 170 can control the operations or flight path of the aircraft 105 in various ways. In some instances, the copilot GBS 170 may not have direct access to control the power lever, yoke and/or the rudder aircraft, but can manipulate them by sending control commands to the FGC 124 and/or FMS 122 (e.g., using a simulated MCDU display). In other scenarios, the copilot GBS 170 can include a remote yoke 175, a remote power lever, and/or remote rudder controls that enable the copilot to control the aircraft 105.

The copilot GBS 170 can further include a headset 176, which comprises one or more audio output devices (e.g., speakers or earphones) and one or more audio input devices (e.g., microphones). In some embodiments, the headset 176 can be coupled to the DCU 173 and/or other component of the copilot GBS 170. The headset 176 enables the copilot to communicate audibly with the pilot located on the aircraft 105. The headset 176 can further enable the copilot to engage in voice or audio-based communications with various ground-based and air-based entities (e.g., such as air traffic control, other aircraft, and other ground-based stations) over the over the multimode radios 125 located on the aircraft 105. The headset 176 can further receive communications from the aircraft 105 (e.g., such as communications from the pilot, communications received over the multi-mode radios 125, and/or communications generated by the CPRS 150) for output to the copilot.

Figure 3B:
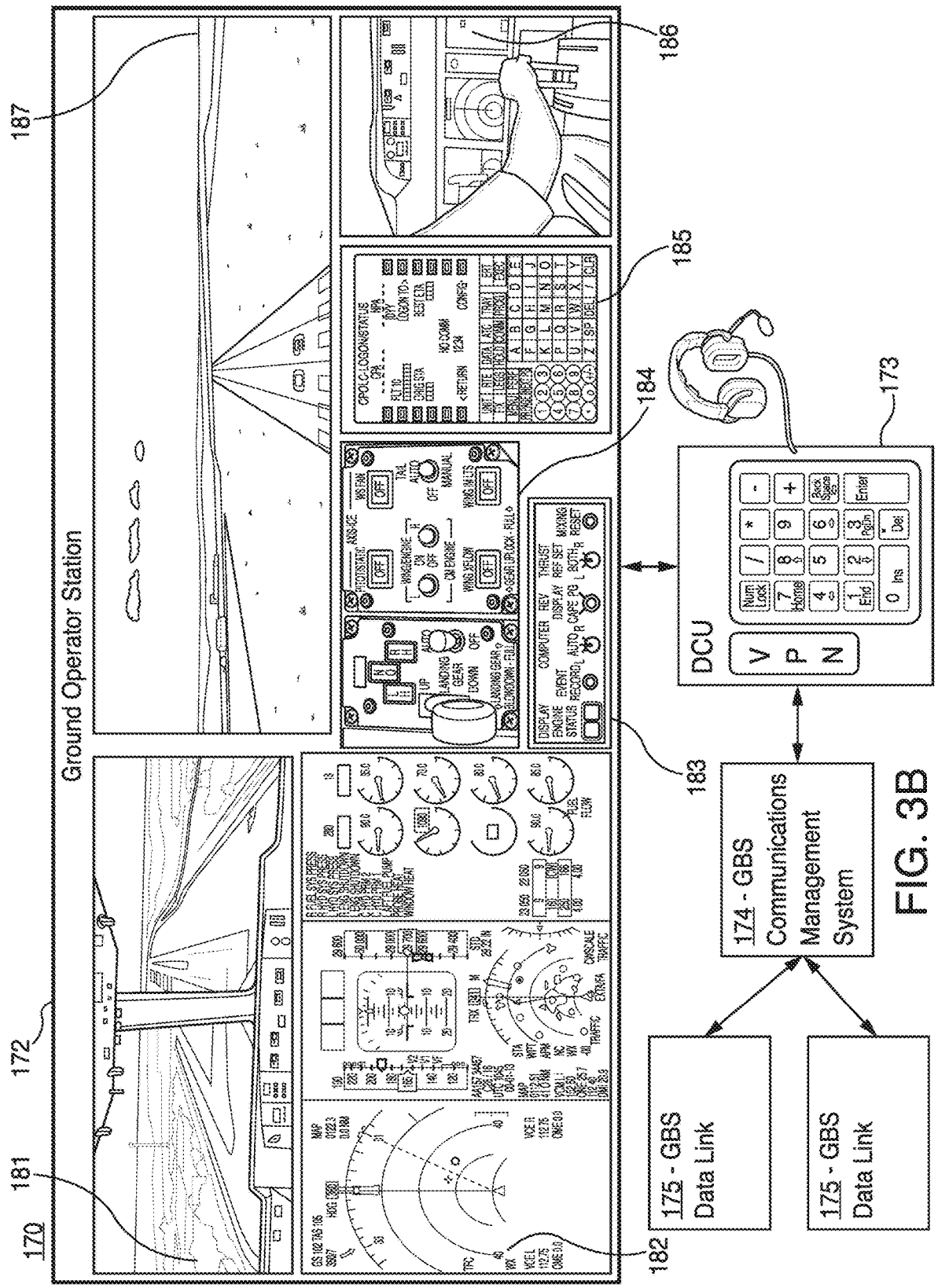
FIG. 3B is an illustration demonstrating an exemplary configuration for a copilot GBS in accordance with certain embodiments.
Figure 3C:
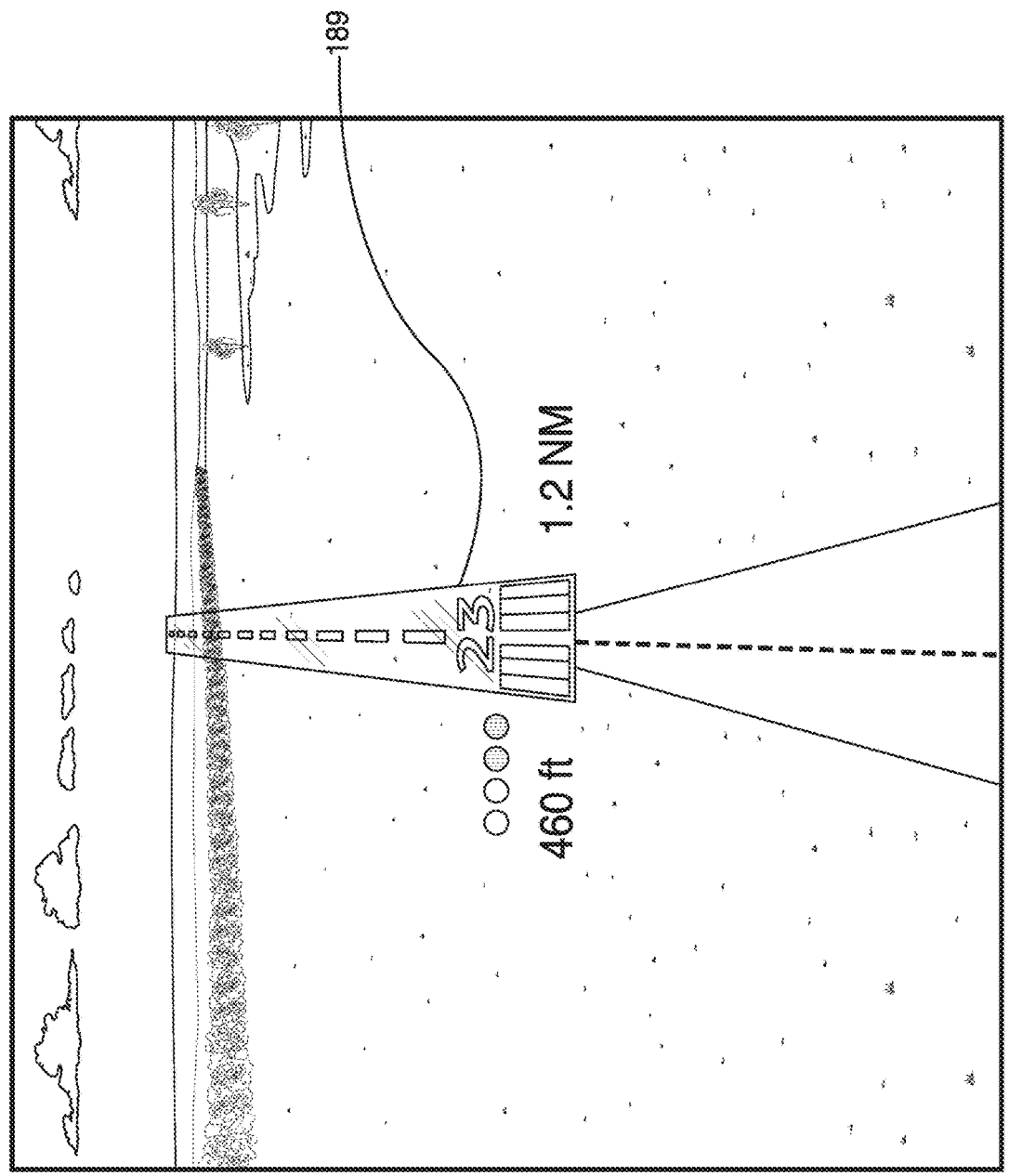
FIG. 3C is a display that can be generated using a flight augmentation system in accordance with certain embodiments.

FIG. 3B illustrates an exemplary configuration for a copilot GBS 170 according to certain embodiments. Amongst other things, the copilot GBS 170 comprises an output display device 172 that presents a GUI comprising a plurality of aircraft displays 180. In this exemplary scenario, the output displays device 172 includes a windshield display 181, an instrument display 182, a flight instrument control panel 183, flight control display 184, a simulated MCDU display 185, an instrument monitoring camera display 186, an exterior aircraft display 187, and a flight augmentation display 188.

It should be noted that the output display device 172 can include additional displays that are not explicitly illustrated. Additionally, one or more of the illustrated displays can be omitted in some embodiments. Moreover, the aircraft displays 180 can be arranged in different configurations on the GUI presented on the output display device 172. In some embodiments, the copilot GBS 170 can include a plurality of output display devices 172, and one or more of the aircraft displays 180 can be presented on a separate output display device 172 and/or on a separate GUI. A copilot operating at the copilot GBS 170 can interact with each of the aircraft displays 180 using various types of input devices (e.g., mouse devices, keyboards, joysticks, etc.).

The windshield display 181 can be configured to display the image and/or video data captured by one or more windshield-facing cameras included in the cockpit monitoring system 152 of the aircraft 105. In some embodiments, the windshield display 181 can provide a real-time or near real-time video feed from the one or more windshield-facing cameras. The windshield display 181 provides the remotely located pilot with visibility through the windshield of the aircraft, similar to the view that would be provided to an onboard copilot.

The instrument display 182 can electronically display and visualize various flight instruments for the aircraft 105. For example, the instrument display 182 can electronically emulate primary flight instruments (e.g., such as an ASI, attitude indicator (or artificial horizon), heading indicator (or directional gyro), turn coordinator (or turn and bank indicator), altimeter, VSI, engine status indicator, etc.) that are physically located in the aircraft 105. Other types of flight instruments also can be electronically presented to the copilot via the instrument display 182.

The flight instrument control panel 183 can electronically display and activate controls that enable the copilot to manipulate various avionics or aircraft components, such as controls for manipulating the autopilot functions, auto-throttle functions, auto land functions, reverse engine functions, event recording, etc. The copilot can provide inputs via the flight instrument control panel 183 to activate/deactivate these functions and/or adjust settings associated with these functions.

The flight controls display 184 can electronically display controls that enable the copilot to manipulate landing gear, wing engines, anti-icing equipment, and/or other aircraft components. The copilot can provide inputs via the flight controls display 184 to activate/deactivate these components and/or adjust settings associated with these functions.

The simulated MCDU display 185 can electronically emulate, simulate, and/or display a traditional or physical MCDU (e.g., such as MCDU 113 physically located in the cockpit of the aircraft 105). The simulated MCDU display 185 can perform the same or similar functions as the MCDU 113 physically located in the cockpit of the aircraft 105. For example, the copilot can interact with the simulated MCDU display 185 to input commands and receive feedback for various aspects of the aircraft's operations, including fuel consumption, flight path, and altitude, and can be utilized to perform functions associated with flight planning, navigation, and performance computations. Amongst other things, the simulated MCDU display 185 permits copilot to directly control the FMS 122, FGC 124, and/or other navigation system in connection with generating and/or modifying flight plans for the aircraft 105. The simulated MCDU 185 display also can enable the copilot to receive data from, and send commands to, various subsystems or components coupled directly or indirectly to the CPRS 150, MCDU 113, and/or simulated MCDU 185.

The instrument monitoring camera display 186 can be configured to display the image and/or video data captured by one or more instrument-facing cameras included in the cockpit monitoring system 152 of the aircraft 105. In some embodiments, the instrument monitoring camera display 186 can provide a real-time or near real-time video feed from the one or more windshield-facing cameras. The instrument monitoring camera display 186 provides the remotely located pilot with visibility of the physical cockpit instruments located on the aircraft.

The exterior aircraft display 187 can be configured to display the image and/or video data captured by one or more exterior vision systems, which may include LiDAR systems and/or one or more cameras (e.g., one or more high-definition cameras and/or one or more infrared cameras). In some embodiments, the instrument monitoring camera display 186 can provide a real-time or near real-time video feed that is generated or captured using data from one or more cameras and/or LiDAR systems situated on the exterior of the aircraft 105. The exterior aircraft display 187 provides the remotely located pilot with visibility of the aircraft's surroundings (e.g., such as a forward facing view that can identify aircraft or other obstacles in or near the aircraft's flight path).

As mentioned above, the copilot can utilize an input device (e.g., a mouse, touchscreen, joystick, etc.) to interact with the aircraft displays 180 and transmit commands to the aircraft 105 connected to the copilot GBS 170.

FIG. 3C illustrates another exemplary aircraft display 180 that can be presented by the output display device 172 and/or other display device of the copilot GBS 170 according to certain embodiments. This flight augmentation display 188 can be generated, at least in part, using the outputs of the flight augmentation system 156 installed on the aircraft. In some embodiments, the flight augmentation system 156 can additionally, or alternatively, be installed or located at the copilot GBS 170.

The flight augmentation display 188 can be configured to display a video feed from a camera that is augmented with various types of objects 189 (e.g., objects corresponding to runways, touchdown location indicators, distance measuring parameters, alert indicators, text, flight parameters, etc.). The video feed can represent a real-time or near real-time video feed that is captured by one or more cameras on the aircraft 105 (e.g., such as cameras or equipment included in the exterior vision system 159 and/or cockpit monitoring system 152). In some embodiments, the video feed can be generated, at least in part, by the LiDAR systems and/or cameras included in the exterior vision system 159. The flight augmentation system 156 onboard the aircraft 105 can augment the video feed the various objects, and the augmented video can be transmitted over the network 190 to the copilot GBS 170 and output via the flight augmentation display 188. In some embodiments, the flight augmentation system 156 (or certain functionalities performed by this component) can be located at the copilot GBS 170 and can augment video feeds after the feeds are transmitted over the network 190 and received by the copilot GBS 170.

In various scenarios, the flight augmentation system 156 can augment video feeds with visual cues that assist a remote copilot with landing the aircraft 105 on approved surfaces or runways. Additionally, in some particularly useful scenarios, the flight augmentation system 156 and flight augmentation display 188 can be utilized to enable a remote copilot to land an aircraft safely on an unapproved surface. The exemplary interface shown in FIG. 3C illustrates a runway object that is added to a video feed to simulate a landing on a surface that does not include a runway (e.g., an open field). The video feed also can be augmented with other objects corresponding to flight parameters (e.g., distance to touchdown, airspeed, angle of attack, etc.) that can assist the copilot with landing the aircraft.

As mentioned above, in scenarios involving an emergency landing on an unapproved surface, the ground-based copilot can provide commands identifying a touchdown location on the unapproved surface (e.g., an open field, body of water, etc.). This information can be transmitted over the network 190 to the flight augmentation system 156. Upon receiving the commands, the flight augmentation system 156 can generate simulated sensor information and guidance commands that instructs the autopilot functions, FMS 122, and/or FGC 124 that the unapproved surface is an approved landing surface, and/or which enables the FGC 124 to generate flight information or parameters for landing the aircraft on the unapproved surface similar to the manner in which the aircraft would be landed on an approved runway. For example, in some cases, the flight augmentation system 156 can calculate simulated signals for glide scope, localizer, glidepath, attitude, heading, altitude, and/or other flight information, and utilize these simulated signals to control the aircraft 105 during landing. Throughout the entire process of landing the aircraft 105 on the unapproved surface, the flight augmentation display 188 can augment with the video feed from the aircraft with a runway object (and/or other objects) to realistically simulate landing on an approved surface.

In the example shown in FIG. 3C, the runway object is presented as an overlay to a video feed, but is generated in a semi-transparent manner. This enables the copilot to view the actual surface underlying the runway object, and to assess whether there are any obstacles on the surface.

Returning to FIG. 3A, certain aircraft displays 180 that present video feeds can be configured in a manner that permits a copilot to easily determine distance measures to objects captured in the video feed. For example, if a copilot desires to understand a distance between the aircraft 105 and an object (e.g., another aircraft, a flock of birds, a road, a building, etc.) captured in the video feed, the copilot can simply select the object on the output display device 172 (or associated GUI) and the distance to that object will be displayed to the copilot. As explained above, the exterior vision system 159 can be utilized to execute distance-measuring functions, which determine the distance to objects captured in the video feed. For example, the LiDAR system and/or cameras included in the exterior vision system 159 can be utilized to determine a reference dimension for a selected object captured, and the outputs of the distance-measuring functions can be displayed to the copilot (e.g., via one or more of the aircraft displays 180).

As mentioned above, the CPRS 150 can include image recognition software that is configured to detect various objects (e.g., obstacles, hazards, and/or safety-impacting flight conditions) captured in camera views. The image recognition software can be applied to identify and/or detect objects in any camera view provided by the aircraft (e.g., video feeds generated by the cockpit monitoring system 152, aircraft sensor systems 131, and/or exterior vision system 159). When these views are presented on aircraft displays 180 (e.g., such as the windshield display 181, exterior aircraft display 187, flight augmentation display 188, etc.) to a copilot located at the copilot GBS 170, the image recognition software can detect objects presented in aircraft displays 180 and the copilot can select objects of interest. In this scenario, the aforementioned distance measuring functions can output the distance between the aircraft of the selected objects.

FIG. 4A illustrates a flow chart for an exemplary method 400A for operating a CPRS according to certain embodiments. Method 400A is merely exemplary and is not limited to the embodiments presented herein. Method 400A can be employed in many different embodiments or examples not specifically depicted or described herein. In some embodiments, the steps of method 400A can be performed in the order presented. In other embodiments, the steps of method 400A can be performed in any suitable order. In still other embodiments, one or more of the steps of method 400A can be combined or skipped. In many embodiments, the CPRS 150, aircraft system 100B, system 100A and/or aircraft 105 can be configured to perform method 400A and/or one or more of the steps of method 400A. In these or other embodiments, one or more of the steps of method 400A can be implemented as one or more computer instructions configured to run at one or more processing devices and configured to be stored at one or more non-transitory computer storage devices. Such non-transitory memory storage devices and processing devices can be part of an avionics or aircraft system such as the CPRS 150, aircraft system 100B, system 100A and/or aircraft 105.

In step 410A, at least one cockpit monitoring system installed in a cockpit of the aircraft monitors one or more displays installed in to generate monitoring data.

In step 420A, at least one monitoring, checklist and warning system (MCWS) installed in the cockpit of the aircraft communicates with a pilot in connection with performing checklist functions, instrument monitoring functions, and warning functions.

In step 430A, at least one communication management system configured to facilitate communications with at least one copilot ground base station (GBS) transmits the monitoring data generated by the at least one cockpit monitoring system and outputs received or derived from at least one data concentrator installed in the aircraft to the at least one copilot GBS via at least one data link.

In step 440A, the at least one communication management system receives communications from the at least one copilot GBS via the at least one data link.

In some embodiments, the step of monitoring, by at least one cockpit monitoring system installed in a cockpit of the aircraft, one or more displays can include one or more of the following: generating, by one or more camera devices installed in the cockpit of the aircraft, video data for monitoring one or more instrument panel displays installed in the cockpit of the aircraft; or receiving, by one or more data connections that couple the one or more instrument panel displays to the at least one cockpit monitoring system, outputs generated by the one or more instrument panel displays.

In some embodiments, the MCWS can be configured to autonomously monitor the checklist functions, the instrument monitoring functions, and the warning functions, and autonomously communicate with the pilot in connection with performing the checklist functions, the instrument monitoring functions, and the warning functions.

In some embodiments, the method 400A may further include one or more steps comprising: capturing, by at least one exterior vision system installed on or near an exterior of the aircraft, external vision data; providing the external vision data to the at least one communication management system; and transmitting, by the at least one communication management system, the external vision data captured by the at least one exterior vision system to the at least one copilot GBS via the at least one data link.

In some embodiments, the step of receiving, by the at least one communication management system, communications from the at least one copilot GBS via the at least one data link can include at least two of the following: (i) receiving, via the at least one data link, communications to remotely control or use one or more radio devices installed on the aircraft for communicating with one or more air-based entities or one or more ground-based entities; (ii) receiving, via the at least one data link, communications for remotely interacting with the pilot in connection with performing the checklist functions, the instrument monitoring functions, and the warning functions; (iii) receiving, via the at least one data link, communications for remotely controlling operation of an autopilot system installed in the aircraft; (iv) receiving, via the at least one data link, communications for remotely controlling operation of an autothrust system installed in the aircraft; (v) receiving, via the at least one data link, via the at least one data link, communications for remotely controlling operation of an autoland system installed in the aircraft; (vi) receiving, via the at least one data link, communications for remotely controlling navigation or maneuvers of the aircraft; and (vii) receiving, via the at least one data link, communications for remotely controlling a flight plan or flight path for the aircraft.

In some embodiments, the method 400A may further include a step of receiving, by via one or more onboard controls of the CPRS, a command to override or restrict control of the aircraft by the at least one copilot GBS or other remote entity.

In some embodiments, the method 400A may further include a step of receiving, by at least one data transfer relay installed in the aircraft, one or more control commands from the at least one copilot GBS for manipulating one or more aircraft components located in the aircraft. In some examples, the at least one data transfer relay enables the at least one copilot GBS to manipulate actuation switches or indicators for at least two of: controlling landing gear, flaps, engines, autopilot functions, autothrottle functions, autonomous landing systems, lighting systems, communication systems, fuel selector systems, or electronic circuit breakers.

Figure 4B:
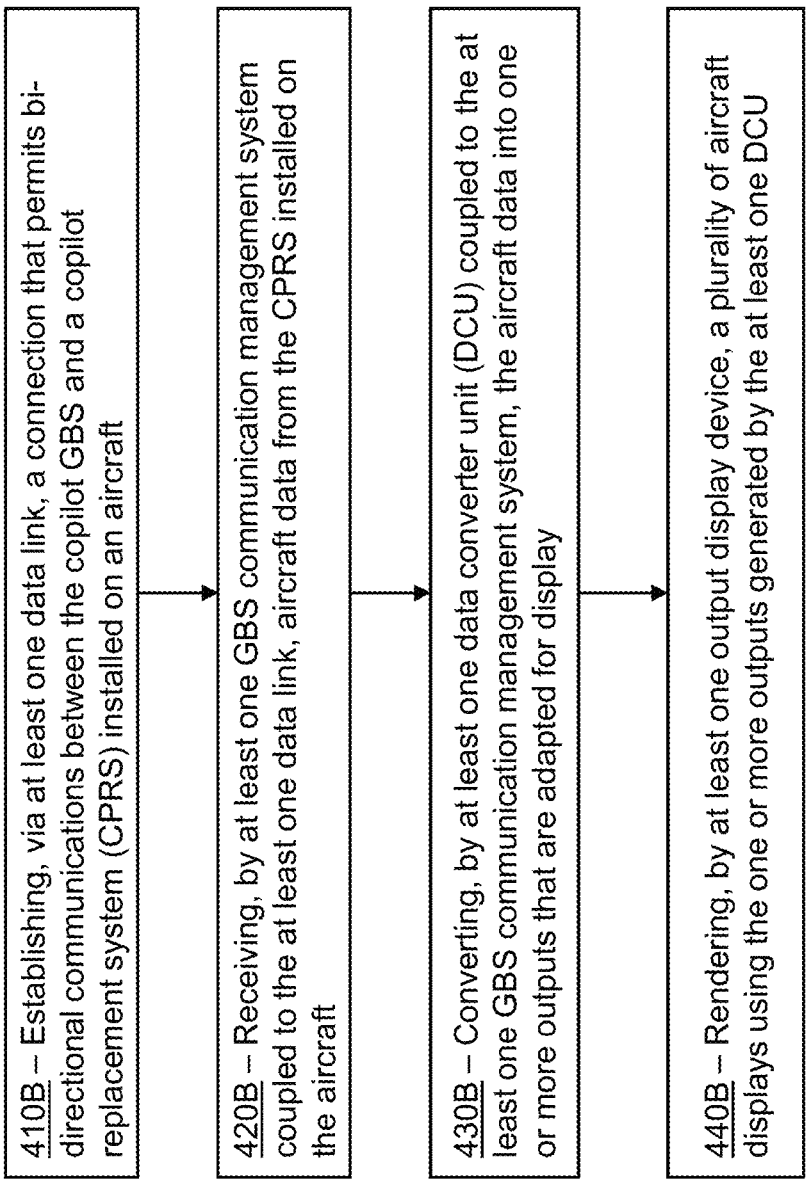
FIG. 4B is a flow chart for a method of operating a copilot GBS in accordance with certain embodiments.

FIG. 4B illustrates a flow chart for an exemplary method 400B for operating a copilot GBS 170 according to certain embodiments. Method 400B is merely exemplary and is not limited to the embodiments presented herein. Method 400B can be employed in many different embodiments or examples not specifically depicted or described herein. In some embodiments, the steps of method 400B can be performed in the order presented. In other embodiments, the steps of method 400B can be performed in any suitable order. In still other embodiments, one or more of the steps of method 400B can be combined or skipped. In many embodiments, the copilot GBS 170, CPRS 150, aircraft system 100B, system 100A and/or aircraft 105 can be configured to perform method 400A and/or one or more of the steps of method 400A. In these or other embodiments, one or more of the steps of method 400B can be implemented as one or more computer instructions configured to run at one or more processing devices and configured to be stored at one or more non-transitory computer storage devices. Such non-transitory memory storage devices and processing devices can be part of a computing system such as the copilot GBS 170, CPRS 150, aircraft system 100B, system 100A and/or aircraft 105.

In step 410B, a connection is established via at least one data link that permits bi-directional communications between the copilot GBS 170 and a CPRS 150 installed on an aircraft 105.

In step 420B, aircraft data from the CPRS 150 installed on the aircraft 105 is received by at least one GBS communication management system 174 coupled to the at least one data link.

In step 430B, the aircraft data is converted by at least one DCU 173 coupled to the at least one GBS communication management system 174 into one or more outputs that are adapted for display.

In step 440B, a plurality of aircraft displays 180 are rendered on at least one output display device 172 using the one or more outputs generated by the at least one DCU.

In certain embodiments, the connection established between the copilot GBS 170 and the CPRS 150 installed on the aircraft enables a ground-based pilot to remotely monitor operations of the aircraft on the at least one output display device 172, communicate with an onboard pilot located in a cockpit of the aircraft, and/or transmit commands for controlling one or more functionalities of the aircraft.

In some embodiments, the method 400B may further include one or more steps comprising: presenting, by the at least one display device of the copilot GBS, a simulated MCDU interface that is configured to display feedback related to the aircraft's operations and receive inputs from the ground-based pilot for controlling the aircraft's operation; and transmitting, based on the inputs received via the simulated MCDU interface, one or more commands over the at least one data link for adjusting settings of a flight management system (FMS) or a flight guidance computer (FGC) installed on the aircraft.

In some embodiments, the method 400B may further include one or more steps comprising: receiving, via the at least one data link installed at the copilot GBS, monitoring data generated by a cockpit monitoring system installed on the aircraft; rendering, by the at least one output display device, one or more aircraft displays that comprises the monitoring data; receiving, via the at least one data link installed at the copilot GBS, outputs generated by, or derived from, at least one data concentrator installed on the aircraft; generating, by the at least one output display device, one or more aircraft displays based, at least in part, on the outputs generated by, or derived from, at least one data concentrator installed on the aircraft; receiving, via the at least one data link installed at the copilot GBS, external vision data captured by at least one exterior vision system installed on or near an exterior of the aircraft; and rendering, by the at least one output display device, one or more aircraft displays that comprises the external vision data.

In some embodiments, the method 400B may further include one or more steps comprising: receiving, via the at least one data link installed at the copilot GBS, data from a monitoring, checklist and warning system (MCWS) installed in the cockpit of the aircraft; and transmitting, via the at least one data link installed at the copilot GBS, commands to the aircraft that enable the ground-based pilot to remotely interact with the MCWS on the aircraft for performing checklist functions, instrument monitoring functions, and warning functions.

In some embodiments, the method 400B may further include one or more steps comprising: transmitting, via the at least one data link, commands to remotely control or use one or more radio devices installed on the aircraft for communicating with one or more air-based entities or one or more ground-based entities; transmitting, via the at least one data link, commands for remotely controlling operation of an autopilot system installed in the aircraft; transmitting, via the at least one data link, commands for remotely controlling operation of an autothrust system installed in the aircraft; transmitting, via the at least one data link, commands for remotely controlling operation of an autoland system installed in the aircraft; transmitting, via the at least one data link, commands for remotely controlling navigation or maneuvers of the aircraft; and/or transmitting, via the at least one data link, commands for remotely controlling a flight plan or flight path for the aircraft.

In some embodiments, the method 400B may further include one or more steps comprising: receiving, via the at least one data link, external vision data captured by an external vision system installed on the aircraft; and rendering, by the at least one output display device, a flight augmentation display based, at least in part, on external vision data, wherein the flight augmentation display augments the external vision data with overlays or objects that provide information for assisting the ground-based pilot with landing the aircraft.

In some embodiments, the method 400B may further include the step of comprising terminating the connection between the copilot GBS and the aircraft in response to an override command.

Embodiments disclosed herein include a copilot replacement system (CPRS) installed in an aircraft comprising: at least one cockpit monitoring system installed in a cockpit of the aircraft, the at least one cockpit monitoring system being configured to generate monitoring data for monitoring one or more displays installed in the cockpit of the aircraft; at least one monitoring, checklist and warning system (MCWS) installed in the cockpit of the aircraft, the at least one MCWS being configured to communicate with a pilot in connection with performing checklist functions, instrument monitoring functions, and warning functions; at least one data link; and at least one communication management system configured to facilitate communications with at least one copilot ground base station (GBS), wherein: the at least one communication management system is coupled to at least one data concentrator installed in the aircraft, and is configured to receive outputs from the at least one data concentrator; the at least one communication management system is coupled to the at least one cockpit monitoring system and is configured to receive the monitoring data from the at least one cockpit monitoring system; the at least one communication management system is coupled to the at least one data link and is configured to transmit the outputs received or derived from the at least one data concentrator and the monitoring data generated by the at least one cockpit monitoring system to the at least one copilot GBS via the at least one data link; and the at least one communication management system is configured to receive communications from the at least one copilot GBS via the at least one data link.

Embodiments disclosed herein include a method for operating a copilot replacement system (CPRS) installed in an aircraft, the method comprising: monitoring, by at least one cockpit monitoring system installed in a cockpit of the aircraft, one or more displays installed in the cockpit to generate monitoring data; communicating, by at least one monitoring, checklist and warning system (MCWS) installed in the cockpit of the aircraft, with a pilot in connection with performing checklist functions, instrument monitoring functions, and warning functions; transmitting, by at least one communication management system configured to facilitate communications with at least one copilot ground base station (GBS), the monitoring data generated by the at least one cockpit monitoring system and outputs received or derived from at least one data concentrator installed in the aircraft to the at least one copilot GBS via at least one data link; and receiving, by the at least one communication management system, communications from the at least one copilot GBS via the at least one data link.

Embodiments disclosed herein include an aircraft system installed in an aircraft comprising: a copilot replacement system (CPRS) that includes at least one cockpit monitoring system, at least one monitoring, checklist and warning system (MCWS), at least one communication management system, and at least one data link; at least one data concentrator; wherein: the at least one communication management system is configured to facilitate communications with at least one copilot ground base station (GBS) via the at least one data link: the at least one communication management system is coupled to the at least one data concentrator installed in the aircraft, and is configured to transmit outputs received from the at least one data concentrator to the at least one copilot GBS via the at least one data link; the at least one communication management system is coupled to the at least one cockpit monitoring system and is configured to transmit monitoring data received from the at least one cockpit monitoring system to the at least one copilot GBS via the at least one data link; and the at least one communication management system is configured to receive communications from the at least one copilot GBS via the at least one data link.

Embodiments disclosed herein include a copilot ground base station (GBS), comprising: at least one GBS communication management system configured to manage bi-directional communications between the copilot GBS and a copilot replacement system (CPRS) installed on an aircraft; at least one data converter unit (DCU) coupled to the at least one GBS communication management system, the at least one DCU configured to receive aircraft data from the CPRS installed on the aircraft and convert the aircraft data into one or more outputs that are adapted for display; at least one output display device configured to render a plurality of aircraft displays, at least in part, using the one or more outputs generated by the at least one DCU; and at least one data link coupled to the at least one GBS communication management system, the at least one data link configured to establish a connection that facilitates the bi-directional communications with the aircraft; and wherein the connection established between the copilot GBS and the aircraft enables a ground-based pilot to remotely monitor operations of the aircraft on the at least one output display device, communicate with an onboard pilot located in a cockpit of the aircraft, and transmit commands for controlling one or more functionalities of the aircraft.

Embodiments disclosed herein include a method for operating a copilot ground base station (GBS), the method comprising: establishing, via at least one data link, a connection that permits bi-directional communications between the copilot GBS and a copilot replacement system (CPRS) installed on an aircraft; receiving, by at least one GBS communication management system coupled to the at least one data link, aircraft data from the CPRS installed on the aircraft; converting, by at least one data converter unit (DCU) coupled to the at least one GBS communication management system, the aircraft data into one or more outputs that are adapted for display; and rendering, by at least one output display device, a plurality of aircraft displays using the one or more outputs generated by the at least one DCU; and wherein the connection established between the copilot GBS and the CPRS installed on the aircraft enables a ground-based pilot to remotely monitor operations of the aircraft on the at least one output display device, communicate with an onboard pilot located in a cockpit of the aircraft, and transmit commands for controlling one or more functionalities of the aircraft.

Embodiments disclosed herein include a copilot ground base station (GBS), comprising: at least one data link configured to establish a connection with an aircraft; at least one GBS communication management system coupled to the at least one data link; at least one data converter unit (DCU) coupled to the at least one GBS communication management system; and at least one output display device coupled to the at least one DCU; wherein: at least one GBS communication management system configured to manage bi-directional communications between the copilot GBS and a copilot replacement system (CPRS) installed on the aircraft; the at least one DCU configured to receive aircraft data from the CPRS installed on the aircraft and convert the aircraft data for display on the at least one output display device; and the at least one output display device is configured to render one or more aircraft displays, wherein a ground-based pilot may utilize the one or more aircraft displays to remotely monitor operations of the aircraft and transmit commands for controlling one or more functionalities of the aircraft.

As evidenced by the disclosure herein, the inventive techniques set forth in this disclosure are rooted in aviation technologies that overcome existing problems in dual-pilot or multi-pilot aircraft, including problems that require two or more onboard pilots to safely the aircraft. The techniques described in this disclosure provide a technical solution (e.g., one that utilizes improved CPRS with autonomous capabilities and/or remote copilot connectivity capabilities) for overcoming the limitations associated with known techniques. This technology-based solution marks an improvement over existing capabilities and functionalities by enabling a single onboard pilot to safely control and navigate the aircraft.

The techniques and solutions described in this disclosure can be applied to navigation systems for any type of aircraft (e.g., commercial airplanes, military airplanes, helicopters, air ships, drones, autonomous aircraft, etc.). Appropriate adaptations or modifications can be incorporated to tailor these techniques and solutions to particular types of aircraft.

Each of the components illustrated in FIGS. 1B, 3A, and 3B (including components 111-113, 121-125, 131-139, 171-176, and 181-187) can include one or more processing devices for executing their respective functions described herein. Each of these components also can include one or more computer storage devices that store instructions to facilitate these and other functions, and the instructions can be executed by the one or more processing devices.

The one or more processing devices may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions.

The one or more computer storage devices may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc.

Embodiments may include a computer program product accessible from a computer-usable or computer-readable medium providing program code for use by or in connection with a computer or any instruction execution system. The computer program product may store instructions for implementing the functionality of the navigation system and/or other component described herein. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or storage devices through intervening private or public networks. Satellite transceivers, wireless transceivers, modems, and Ethernet cards are just a few of the currently available types of network adapters.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components is for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A copilot replacement system (CPRS) installed in an aircraft comprising:
   a cockpit monitoring system installed in a cockpit of the aircraft, the cockpit monitoring system being configured to generate monitoring data for monitoring one or more displays installed in the cockpit of the aircraft;
   at least one monitoring, checklist and warning system (MCWS) installed in the cockpit of the aircraft, the at least one MCWS being configured to communicate with a pilot in connection with performing checklist functions, instrument monitoring functions, and warning functions;
   at least one data link; and
   at least one communication management system configured to facilitate communications with at least one copilot ground base station (GBS) that enables a remote copilot to be remotely connected to the aircraft via a connection established through the at least one data link, wherein:
      the at least one communication management system is coupled to at least one data concentrator installed in the aircraft, and is configured to receive outputs from the at least one data concentrator;
      the at least one communication management system is coupled to the cockpit monitoring system and is configured to receive the monitoring data from the cockpit monitoring system;
      the at least one communication management system is coupled to the at least one data link and is configured to transmit the outputs received or derived from the at least one data concentrator and the monitoring data generated by the cockpit monitoring system to the at least one copilot GBS via the at least one data link; and
      the at least one communication management system is configured to receive communications from the at least one copilot GBS via the at least one data link.

2. The copilot replacement system of claim 1, wherein the cockpit monitoring system includes:
   one or more camera devices installed in the cockpit of the aircraft, and the monitoring data includes video data generated by the one or more camera devices for monitoring one or more instrument panel displays installed in the cockpit of the aircraft; or
   one or more data connections that couple outputs of one or more instrument panel displays to the cockpit monitoring system and permit the cockpit monitoring system to receive the outputs generated by the one or more instrument panel displays.

3. The copilot replacement system of claim 1, wherein the MCWS is configured to autonomously monitor the checklist functions, the instrument monitoring functions, and the warning functions, and autonomously communicate with the pilot in connection with performing the checklist functions, the instrument monitoring functions, and the warning functions.

4. The copilot replacement system of claim 1, wherein:
   the CPRS further includes at least one exterior vision system installed on or near an exterior of the aircraft;
   the at least one exterior vision system comprises one or more LiDAR (light detection and ranging) systems, one or more IR (infrared) cameras, or one or more camera devices configured to capture external vision data outside of the aircraft; and
   the at least one communication management system is coupled to the at least one exterior vision system and is configured to transmit the captured external vision data to the at least one copilot GBS via the at least one data link.

5. The copilot replacement system of claim 4, wherein the external vision data is utilized by the at least one copilot GBS to execute distance-measuring functions, which determine a distance from the aircraft to one or more objects captured in the external vision data.

6. The copilot replacement system of claim 1, wherein the communications received by the at least one communication management system from the at least one copilot GBS via the at least one data link enable the at least one copilot GBS to:
   remotely control or use one or more radio devices installed on the aircraft for communicating with one or more air-based entities or one or more ground-based entities; and
   remotely interact with the pilot in connection with performing the checklist functions, the instrument monitoring functions, and the warning functions; and
   remotely control operation of the aircraft.

7. The copilot replacement system of claim 6, wherein the communications received by the at least one communication management system from the at least one copilot GBS via the at least one data link enable the at least one copilot GBS to remotely control operation of the aircraft, at least in part, by:
   remotely controlling operation of an autopilot system installed in the aircraft;
   remotely controlling operation of an autothrust system installed in the aircraft; and
   remotely controlling operation of an autoland system installed in the aircraft.

8. The copilot replacement system of claim 6, wherein the communications received by the at least one communication management system from the at least one copilot GBS via the at least one data link enable the at least one copilot GBS to remotely control operation of the aircraft, at least in part, by:
   remotely controlling navigation or maneuvers the aircraft; and
   remotely controlling flight plans for the aircraft.

9. The copilot replacement system of claim 1, wherein the CPRS further includes one or more onboard controls that enable the pilot to override or restrict control of the aircraft by the at least one copilot GBS or another remote entity connected to the aircraft.

10. The copilot replacement system of claim 1, wherein the CPRS further includes at least one data transfer relay, the at least one data transfer relay being configured to receive control commands from the at least one copilot GBS for manipulating one or more aircraft components.

11. The copilot replacement system of claim 10, wherein the at least one data transfer relay enables the at least one copilot GBS to manipulate actuation switches or indicators for at least two of: controlling landing gear, flaps, engines, autopilot functions, autothrottle functions, autonomous landing systems, lighting systems, communication systems, fuel selector systems, or electronic circuit breakers.

12. A method for operating a copilot replacement system (CPRS) installed in an aircraft, the method comprising:
   monitoring, by a cockpit monitoring system installed in a cockpit of the aircraft, one or more displays installed in the cockpit to generate monitoring data; communicating, by at least one monitoring, checklist and warning system (MCWS) installed in the cockpit of the aircraft, with a pilot in connection with performing checklist functions, instrument monitoring functions, and warning functions;

transmitting, by at least one communication management system configured to facilitate communications with at least one copilot ground base station (GBS) that enables a remote copilot to be remotely connected to the aircraft via a connection established through at least one data link, the monitoring data generated by the cockpit monitoring system and outputs received or derived from at least one data concentrator installed in the aircraft to the at least one copilot GBS via the at least one data link; and receiving, by the at least one communication management system, communications from the at least one copilot GBS via the at least one data link.

13. The method of claim 12, wherein monitoring, by the cockpit monitoring system installed in a cockpit of the aircraft, one or more displays includes:

generating, by one or more camera devices installed in the cockpit of the aircraft, video data for monitoring one or more instrument panel displays installed in the cockpit of the aircraft; or receiving, by one or more data connections that couple one or more instrument panel displays to the cockpit monitoring system, outputs generated by the one or more instrument panel displays.

14. The method of claim 12, wherein the MCWS is configured to autonomously monitor the checklist functions, the instrument monitoring functions, and the warning functions, and autonomously communicate with the pilot in connection with performing the checklist functions, the instrument monitoring functions, and the warning functions.

15. The method of claim 12, wherein the method further comprises:

capturing, by at least one exterior vision system installed on or near an exterior of the aircraft, external vision data;

providing the external vision data to the at least one communication management system; and transmitting, by the at least one communication management system, the external vision data captured by the at least one exterior vision system to the at least one copilot GBS via the at least one data link.

16. The method of claim 12, wherein receiving, by the at least one communication management system, communications from the at least one copilot GBS via the at least one data link includes at least two of the following:

receiving, via the at least one data link, communications to remotely control or use one or more radio devices installed on the aircraft for communicating with one or more air-based entities or one or more ground-based entities;

receiving, via the at least one data link, communications for remotely interacting with the pilot in connection with performing the checklist functions, the instrument monitoring functions, and the warning functions;

receiving, via the at least one data link, communications for remotely controlling operation of an autopilot system installed in the aircraft;

receiving, via the at least one data link, communications for remotely controlling operation of an autothrust system installed in the aircraft;

receiving, via the at least one data link, communications for remotely controlling operation of an autoland system installed in the aircraft;

receiving, via the at least one data link, communications for remotely controlling navigation or maneuvers of the aircraft; and receiving, via the at least one data link, communications for remotely controlling a flight plan or flight path for the aircraft.

17. The method of claim 12, wherein the method further comprises:

receiving, by via one or more onboard controls of the CPRS, a command to override or restrict control of the aircraft by the at least one copilot GBS or other remote entity connected to the aircraft.

18. The method of claim 12, wherein the method further comprises:

receiving, by at least one data transfer relay installed in the aircraft, one or more control commands from the at least one copilot GBS for manipulating one or more aircraft components located in the aircraft; and wherein the at least one data transfer relay enables the at least one copilot GBS to manipulate actuation switches or indicators for at least two of: controlling landing gear, flaps, engines, autopilot functions, autothrottle functions, autonomous landing systems, lighting systems, communication systems, fuel selector systems, or electronic circuit breakers.

19. An aircraft system installed in an aircraft comprising:

a copilot replacement system (CPRS) that includes a cockpit monitoring system, at least one monitoring, checklist and warning system (MCWS), at least one communication management system, and at least one data link; and at least one data concentrator;

wherein:

the at least one communication management system is configured to facilitate communications with at least one copilot ground base station (GBS) that enables a remote copilot to be remotely connected to the aircraft via a connection established through the at least one data link:

the at least one communication management system is coupled to the at least one data concentrator installed in the aircraft, and is configured to transmit outputs received from the at least one data concentrator to the at least one copilot GBS via the at least one data link;

the at least one communication management system is coupled to the cockpit monitoring system and is configured to transmit monitoring data received from the cockpit monitoring system to the at least one copilot GBS via the at least one data link; and the at least one communication management system is configured to receive communications from the at least one copilot GBS via the at least one data link.

20. The aircraft system of claim 19, wherein aircraft system further comprises:

at least one monitoring, checklist and warning system (MCWS) installed in a cockpit of the aircraft, the at least one MCWS being configured to communicate with a pilot in connection with performing checklist functions, instrument monitoring functions, and warning functions.

21. The aircraft system of claim 20, wherein the MCWS includes:

an autonomous operational mode in which the MCWS autonomously monitors the checklist functions, the instrument monitoring functions, and the warning functions, and autonomously communicates with the pilot in connection with performing the checklist functions, the instrument monitoring functions, and the warning functions; and a remote control operational mode in which the MCWS is accessed by the at least one copilot GBS and the at least one copilot GBS controls the checklist functions, the instrument monitoring functions, and the warning functions.

22. The aircraft system of claim 19, wherein the communications received by the at least one communication management system from the at least one copilot GBS via the at least one data link enable the at least one copilot GBS to perform at least two of the following:

remotely control or use one or more radio devices installed on the aircraft for communicating with one or more air-based entities or one or more ground-based entities;

remotely interact with an onboard pilot in connection with performing checklist functions, instrument monitoring functions, and warning functions;

remotely control operation of an autopilot system installed in the aircraft;

remotely control operation of an autothrust system installed in the aircraft;

remotely control operation of an autoland system installed in the aircraft;

remotely control navigation or maneuvers of the aircraft; and remotely control a flight plan or a flight path for the aircraft.

* * * * *